(12) United States Patent
Ohtsuki et al.

(10) Patent No.: US 6,939,050 B2
(45) Date of Patent: Sep. 6, 2005

(54) WHEEL SUPPORT BEARING ASSEMBLY

(75) Inventors: Hisashi Ohtsuki, Iwata (JP); Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/734,250

(22) Filed: Dec. 15, 2003

(65) Prior Publication Data

US 2004/0126044 A1 Jul. 1, 2004

Related U.S. Application Data

(62) Division of application No. 10/090,752, filed on Mar. 6, 2002, now Pat. No. 6,692,153.

(30) Foreign Application Priority Data

| Mar. 7, 2001 | (JP) | ........................................ 2001-062985 |
| Mar. 7, 2001 | (JP) | ........................................ 2001-062986 |
| Oct. 25, 2001 | (JP) | ........................................ 2001-327554 |
| Feb. 15, 2002 | (JP) | ........................................ 2002-038079 |

(51) Int. Cl.[7] ............................................. F16C 19/08
(52) U.S. Cl. .................................... 384/448; 384/482
(58) Field of Search ............................... 384/448, 482, 384/486, 446, 544

(56) References Cited

U.S. PATENT DOCUMENTS 6,573,705 B1   6/2003   Tajima et al.

2002/0140418 A1   10/2002   Ichiman

OTHER PUBLICATIONS

Patent Abstracts of Japan Publication No. 06–281018, Oct. 7, 1994, SNR Roulements.

*Primary Examiner*—Lenard A. Footland

(57) ABSTRACT

A wheel support bearing assembly includes inner and outer members (1 and 2) and at least one row of rolling elements (3) operatively interposed between the inner and outer members (1 and 2) and an annular sealing device (5) sealing an open end of an annular space defined between the inner and outer members (1 and 2). The sealing device (5) includes first and second annular sealing plates (11 and 12) fitted to different members out of the inner and outer members (1 and 2). Each of the first and second sealing plates (11 and 12) includes a generally cylindrical wall (11*a* or 12*a*) and a radial wall (11*b* or 12*b*) assembled together to represent a generally L-shaped section. The first sealing plate (11) is fitted to one of the inner and outer members (1 and 2) that serves as a rotating member. An elastic member (14) mixed with a powdered magnetic material is bonded by vulcanization to the radial wall (11*b*) of the first sealing plate (11). A protective cover (18) made of a non-magnetic material is positioned on one side adjacent an exterior of the multi-pole magnet (14) with a predetermined air gap left therebetween that the number of revolution can be detected through the protective cover (18).

1 Claim, 15 Drawing Sheets

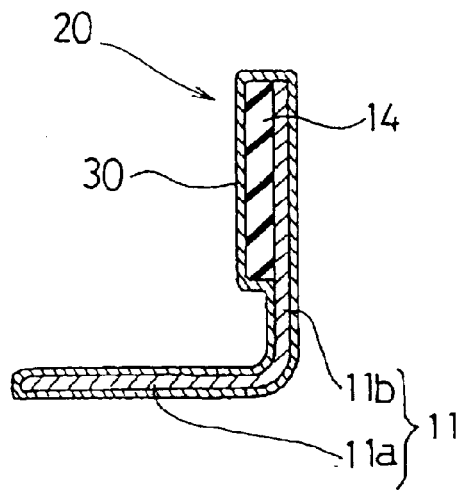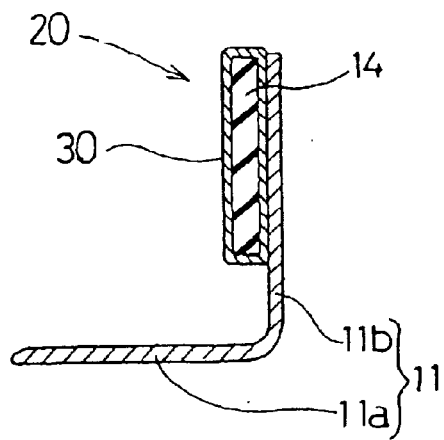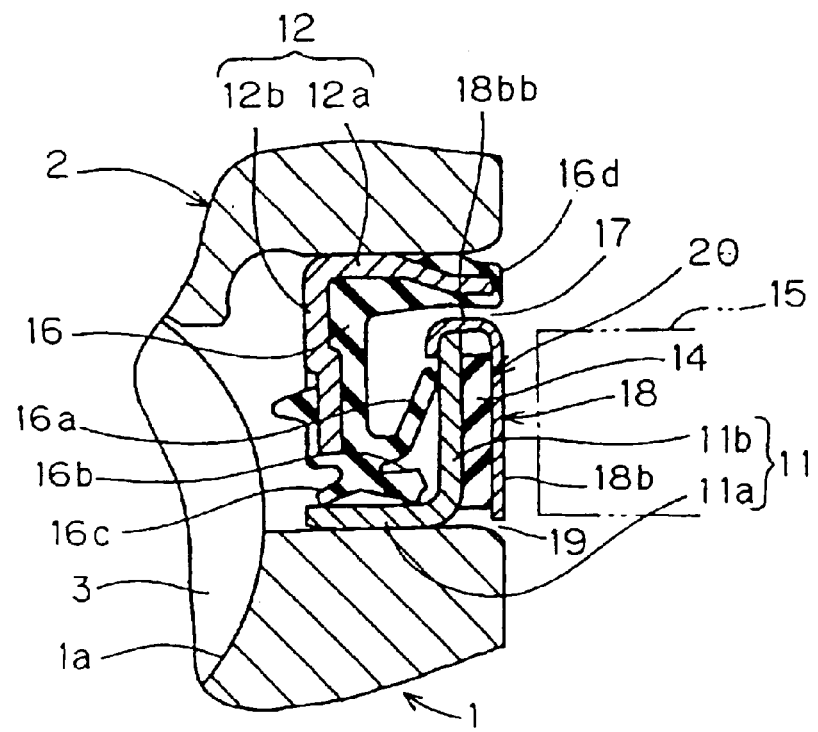

US 6,939,050 B2

WHEEL SUPPORT BEARING ASSEMBLY

CROSS-REFERENCE TO RELATED APPLICATIONS

This application is a divisional of U.S. patent application Ser. No. 10/090,752, filed Mar. 6, 2002 now U.S. Pat. No. 6,692,153, allowed.

This application is based upon and claims the priority of Japanese application nos. 2001-062985 filed Mar. 7, 2001, 2001-062986 filed Mar. 7, 2001, 2001-327554 filed Oct. 25, 2001 and 2002-038079 filed Feb. 15, 2002, and U.S. patent application Ser. No. 10/090,752, filed Mar. 6, 2002, the contents of each being incorporated herein by reference.

BACKGROUND OF THE INVENTION

1. Field of the Invention

The present invention generally relates to a wheel support bearing assembly for an automotive vehicle or the like and, more particularly, to the wheel support bearing assembly integrated with a magnetic encoder for detection of the number of revolution of a wheel.

2. Description of the Prior Art

As shown in FIG. 23, the wheel support bearing assembly is well known, which includes generally cylindrical inner and outer members 101 and 102 positioned one radially inside the other with an annular space defined therebetween, dual rows of rolling elements 103 interposed between the inner and outer members 101 and 102 and rollingly movably positioned within the annular space, an annular sealing device 105 accommodated within and positioned at one of opposite ends of the annular space, and an annular magnetic encoder 106 integrated together with the sealing device 105. This known wheel support bearing assembly is disclosed in, for example, the Japanese Laid-open Patent Publication No. 6-281018.

In this known wheel support bearing assembly, the sealing device 105 includes generally L-sectioned first and second annular sealing plates 107 and 108 press-fitted onto an outer periphery of the inner member 101 and into a bore of the outer member 102, respectively, and an annular sealing strip 109 secured to the second annular sealing plate 108. The first sealing plate 107 is generally referred to as a slinger. The annular magnetic encoder 106 employed therein is in the form of an elastic member (also referred to as a multi-pole magnet) 111 made of a vulcanizable elastic material mixed with a powdered magnetic material and is bonded by vulcanization to the first sealing plate 107. The multi-pole magnet 111 has a plurality of magnetic N- and S-poles alternately defined therein in a direction circumferentially thereof and is operatively associated with a magnetic sensor 110 disposed in face-to-face relation with the multi-pole magnet 111 to detect the number of revolutions of the wheel rotatably supported by the wheel support bearing assembly.

With the known wheel support bearing assembly of the structure discussed above, it has been found that in the event of ingress of foreign matter such as, for example, stones or rocks into a working gap delimited between the multi-pole magnet 111 and the magnetic sensor 110, the multi-pole magnet 111 and, hence, the magnetic encoder 106 may be impaired, resulting in failure to detect the number of revolutions of the wheel properly.

SUMMARY OF THE INVENTION

Accordingly, it is a primary object of the present invention to provide a wheel support assembly designed to prevent foreign matter from being caught in between the multi-pole magnet and the magnetic sensor and, if not at all, to render the multi-pole magnet to be little damaged.

In order to accomplish the foregoing object, the present invention in accordance with a first aspect thereof provides a wheel support bearing assembly which includes an outer member; an inner member positioned inside the outer member to define an annular space therebetween; at least one row of rolling element accommodated within the annular space and operatively interposed between the inner and outer members; a sealing device for sealing an open end of the annular space; and a protective cover made of a non-magnetic material.

The sealing device includes first and second annular sealing plates fitted to different members out of the inner and outer members. Each of the first and second sealing plate includes a generally cylindrical wall and a radial wall assembled together to represent a generally L-shaped section, the first and second sealing plates being positioned within the annular space in face-to-face relation with each other. The first sealing plate is fitted to a rotating member out of the inner and outer members with the radial wall of the first sealing plate positioned on one side adjacent an exterior of the bearing assembly. An annular multi-pole magnet having a plurality of different magnetic poles alternating in a direction circumferentially thereof is fitted to the radial wall of the first sealing plate. On the other hand, the second sealing plate includes a side sealing lip, slidingly engaged with the radial wall of the first sealing plate and opposedly extending radial sealing lips slidingly engaged with the cylindrical wall of the first sealing plate. The cylindrical wall of the second sealing plate is positioned adjacent a slight distance from a free edge of the radial wall of the first sealing plate with a slight radial gap defined therebetween. The protective cover referred to above is disposed exteriorly of the multi-pole magnet and positioned adjacent thereto with a predetermined air gap defined therebetween so that a number of revolution can be detected through the protective cover.

The multi-pole magnet referred to above may be in the form of a sintered magnet, or may be made of an elastic member, such as a rubber, or a plastics material mixed with a powdered magnetic material.

According to the first aspect of the present invention, since the protective cover is used and positioned exteriorly of the multi-pole magnet forming a part of the magnetic encoder so that the number of revolution can be detected through the protective cover, any possible "biting" of foreign matter in between the magnetic sensor for the detection of the number of revolutions and the multi-pole magnet can be prevented by the presence of the protective cover. Also, even if the foreign matter is caught in between the protective cover and the magnetic sensor, the foreign matter does not directly contact the multi-pole magnet and, therefore, the multi-pole magnet is hardly damaged. Also, since the protective cover is positioned adjacent the multi-pole magnet forming the part of the magnetic encoder with the predetermined air gap intervening therebetween, rotation of the multi-pole magnet will not be disturbed by the protective cover. Yet, since the protective cover is made of the non-magnetic material, detection of the magnetic encoder by the magnetic sensor will not be disturbed undesirably.

In the first aspect of the present invention, the protective cover may be fitted to one of the first and second members that serves as a stationary member. With this design, the protective cover does not rotate and, since the protective cover and the magnetic sensor, both held stationary, confront with each other, the foreign matter can advantageously be prevented from entering in between the protective cover and the magnetic sensor during rotation.

Preferably, a slight labyrinth gap is defined between the protective cover and one of the first and second members that serves as a rotating member. The presence of the labyrinth seal is effective to avoid any possible ingress of dusts into the annular space between the inner and outer members through between the protective cover and the rotating member without the rotation of the rotating member being disturbed.

Also, a sealing lip may be provided, which is integrated with a radial edge of the protective cover and held in sliding contact with an end face of one of the inner and outer members that serves as a rotating member. The provision of the protective cover with the sealing lip is effective to avoid any possible ingress of the dusts into the annular space between the inner and outer members through between the protective cover and the rotating member.

The protective cover may be fitted to an outer periphery of the outer member. In this case, since the protective cover is mounted on the outer periphery of the outer member, unlike the case in which the protective cover is mounted on an inner periphery of the outer member, any possible space for disposition of the protective cover at an open end of the annular space between the inner and outer members can be dispensed with and a sufficient sectional height of the sealing device including the first and second sealing plate can advantageously be secured.

The protective cover may have a mounting portion, and further comprising a sealing rubber integrated with the mounting portion of the protective cover. This design is effective to avoid any possible ingress of dusts inwardly of the annular space between the inner and outer members from a mounting region of the protective cover.

According to a second aspect of the present invention, there is provided a wheel support bearing assembly similar to that provided for according to the above described first aspect of the present invention, but differing therefrom in that in the second aspect of the present invention that portion exteriorly of the multi-pole magnet is covered by the protective cover.

According to the second aspect of the present invention, since that portion exteriorly of the multi-pole magnet is covered by the protective cover of the non-magnetic material, any possible biting of the foreign matter in between the multi-pole magnet and the magnetic sensor can be avoided and, even if it occurs, there is no possibility of the multi-pole magnet being damaged. Since the protective cover is made of the non-magnetic material, the presence of the protective cover will not disturb detection performed by the magnetic sensor. Where the multi-pole magnet is made of an elastic member or a plastics material mixed with the powdered magnetic material, molding is easy to achieve and it can be molded to any desired shape such as, for example, forming an engagement portion cooperable with the radial wall of the sealing plate, and fitting to the radial wall can be performed easily. Where the multi-pole magnet is made of the elastic member such as a rubber, it can be bonded by vulcanization to the radial wall. Where the multi-pole magnet is made of the elastic member, although it appears that the multi-pole magnet is susceptible to damage in contact with the foreign matter since the elastic member is soft and flexible, the use of the protective cover intended to cover the multi-pole magnet is effective in avoiding any possible damage to the multi-pole magnet. Where the multi-pole magnet is in the form of the sintered magnet, it can provide an excellent magnetic force.

In the second aspect of the present invention, the protective cover may be fitted to one of the inner and outer members that serves as a rotating member.

Considering that the multi-pole magnet is mounted on the rotating member, fitting of the protective cover to the rotating member is effective to allow the protective cover to be disposed in contact with the multi-pole magnet without constituting any obstacle to rotation. For this reason, the presence of the protective cover between the multi-pole magnet and the magnetic sensor does not require the distance between the multi-pole magnet and the magnetic sensor to be increased for the rotation tolerance and there is no problem associated with reduction in detection output indicative of the number of revolutions.

Preferably, the protective cover may be of a generally L-sectioned shape including an upright wall, covering the multi-pole magnet, and a cylindrical wall fitted to one of the inner and outer members that serves as a rotating member, said first sealing plate being fitted to the cylindrical wall of the protective cover.

Where the protective cover is so configured and so shaped as to represent the generally L-sectioned shape, mere mounting of the cylindrical wall of the protective cover on the rotating member allows the protective cover as a whole to be mounted with the upright wall covering the multi-pole magnet. For this reason, the mounting of the protective cover can be firmly achieved by means of its cylindrical wall and can therefore be achieved easily.

An elastic sealing member may be interposed between the protective cover and one of the inner and outer members that serves as a rotating member. The presence of the elastic member between the protective cover and the rotating member is effective to enhance the sealing performance of the mounting region therebetween and to avoid any possible ingress of dusts and/or water from this mounting region into the annular space between the inner and outer members.

Preferably, the protective cover has an outer peripheral edge engaged with an outer peripheral edge of the radial wall of the first sealing plate. When the outer peripheral edge of the protective cover is engaged over the outer peripheral edge of the radial wall of the first sealing plate, the protective cover can easily be fitted to the rotating member. Also, since it is engaged with the upright wall where the multi-pole magnet is fitted, the protective cover can be firmly, but easily fitted so as to cover the multi-pole magnet.

In the practice of the second aspect of the present invention, the multi-pole magnet may have its opposite surfaces bonded respectively to the protective cover and the radial wall of the first sealing plate while being sandwiched between the protective cover and the radial wall of the first sealing plate. Where the multi-pole magnet is made of the elastic member such as a rubber, the bonding can be achieved by vulcanization. According to this design, when the multi-pole magnet is to be bonded to the first sealing plate, the protective cover can be bonded at the same time. For this reason, fitting of the protective cover to the rotating member can be simply and easily achieved.

According to a third aspect of the present invention, there is provided a wheel support bearing assembly which includes an outer member; an inner member positioned inside the outer member to define an annular space therebetween; at least one row of rolling element accommodated within the annular space and operatively interposed between the inner and outer members; a sealing device for sealing an open end of the annular space; a protective cover of a generally L-shaped section having an upright wall and a generally cylindrical wall both defined therein; and an annular multi-pole magnet having a plurality of different magnetic poles alternating in a direction circumferentially thereof and fitted to the radial wall of the first sealing plate secured to an inner face of the upright wall of the protective cover.

The sealing device includes first and second annular sealing plates fitted to different members out of the inner and outer members, each of the first and second sealing plate including a generally cylindrical wall and a radial wall assembled together to represent a generally L-shaped section, the first and second sealing plates being positioned within the annular space in face-to-face relation with each other. The first sealing plate is fitted to a rotating member out of the inner and outer members with the radial wall of the first sealing plate positioned on one side adjacent an exterior of the bearing assembly. The second sealing plate includes a side sealing lip, slidingly engaged with the radial wall of the first sealing plate and opposedly extending radial sealing lips slidingly engaged with the cylindrical wall of the first sealing plate, the cylindrical wall of the second sealing plate being positioned adjacent a slight distance from a free edge of the radial wall of the first sealing plate with a slight radial gap defined therebetween. The protective cover is positioned so as to confront the radial wall of the first sealing plate and the cylindrical wall of the protective cover is mounted on one of the first and second members that serves as a rotating member and wherein the cylindrical wall of the first sealing plate is mounted on the cylindrical wall of the protective cover.

According to the third aspect of the present invention, since the multi-pole magnet is provided on the inner face of the upright wall of the protective cover, the foreign matter possibly entering in the gap between the protective cover and the magnetic sensor will be caught in between the protective cover and the magnetic sensor and will not directly contact the multi-pole magnet. For this reason, there is no possibility that the multi-pole magnet may be damaged by the foreign matter so caught in therebetween. Since the protective cover is made of the non-magnetic material, the presence of the protective cover will not disturb detection of the multi-pole magnet. Also, since the multi-pole magnet is carried by the protective cover, the multi-pole magnet can be provided separate from the sealing plates of the sealing device and, therefore, the sealing device can easily be manufactured.

According to a fourth aspect of the present invention, there is provided a wheel support bearing assembly similar to that provided for according to the above described first aspect of the present invention, but differing therefrom in that in the fourth aspect of the present invention the protective cover is positioned outside the multi-pole magnet to cover an external portion of the multi-pole magnet and includes an outer peripheral edge portion bent to protrude axially inwardly of the annular space between the first and second members, and the outer peripheral edge portion of the protective cover is crimped over an outer peripheral edge of the radial wall of the first sealing plate.

According to the fourth aspect of the present invention, since a portion exteriorly of the multi-pole magnet is covered by the protective cover, any possible ingress of the foreign matter in between the multi-pole magnet and magnetic sensor if it occur do not lead to damages to the multi-pole magnet. Since the protective cover is made of the non-magnetic material, the presence of the protective cover does not disturb detection performed by the magnetic sensor. Also, since the protective cover is coupled with the first sealing plate with its outer peripheral edge portion crimped over the outer peripheral edge of the radial wall of the first sealing plate, the mounting is simple and firm and therefore, excellent in mass productivity.

In the present invention, the outer peripheral edge portion of the protective cover may have a plurality of cutouts defined therein at corresponding locations circumferentially thereof so as to extend inwardly thereof to thereby leave a corresponding number of pawls each positioned between the neighboring cut-outs, said pawls being crimped over the outer peripheral edge of the radial wall of the first sealing plate. Formation of the pawls by the presence of the cutouts in the outer peripheral edge portion of the protective cover is effective to facilitate the crimping work with the crimping width for each pawl being narrow.

Preferably, the protective cover may have an inner peripheral edge formed with a reinforcement rib. The provision of the reinforcement rib at the inner peripheral edge of the protective cover is effective to avoid any possible deformation of the inner peripheral edge of the protective cover during crimping of the outer peripheral edge portion thereof and, therefore, there is no possibility that the bondability of the protective cover to the multi-pole magnet may be reduced as a result of a possible deformation. In general the gap between the multi-pole magnet and the magnetic sensor confronting the multi-pole magnet is advantageously set to a very small gap in order to increase the magnetic characteristic by reducing the magnetic gap. For this reason, if the bondability of the protective cover to the multi-pole magnet is insufficient, interference with the magnetic sensor will occur and the gap cannot be set to a very small size. The problem associated with this interference resulting from the insufficient bondability can be eliminated by the presence of the reinforcement rib at the inner peripheral edge of the protective cover.

The protective cover preferably has a plate thickness within the range of 0.1 to 1.0 mm, preferably within the range of 0.2 to 1.0 mm, and more preferably within the range of 0.3 to 1.0 mm. Material for the protective cover is, for example, a metal sheet.

In order to minimize the magnetic gap between the multi-pole magnet and the magnetic sensor, the use of the protective cover of a thickness as small as possible is preferable. However, if the thickness is too small, the protective cover will lack a sufficient strength and the bondability between the multi-pole magnet and the protective cover will be lost as a result of deformation taking place during the crimping of the peripheral edge portion of the protective cover. If the thickness of the protective cover is not greater than 0.1 mm, there is the possibility of the protective cover being deformed as discussed above, but if it exceeds 1.0 mm, the magnetic gap will increase excessively.

The protective cover may be made of non-magnetic stainless steel and may have a Vickers hardness of not greater than Hv 200. If the protective cover is made of stainless steel, it can have a resistance to rusting and have an excellent strength. However, if the hardness exceeds Hv 200, there is the possibility that the protective cover may be deformed during crimping of the outer peripheral edge portion thereof. The stainless steel if not hardened exhibits a hardness of Hv 200.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 15A and 15B are fragmentary sectional views, on an enlarged scale, showing different forms of an annular protective cover and a magnetic encoder both used in the wheel support bearing assembly, respectively;

FIG. 16 is a fragmentary longitudinal sectional view, showing a variation of the wheel support bearing assembly of FIG. 14;

DETAILED DESCRIPTION OF THE EMBODIMENTS

Hereinafter, some preferred embodiments of the present invention will be described with reference to the accompanying drawings.

First Embodiment

Figure 1:
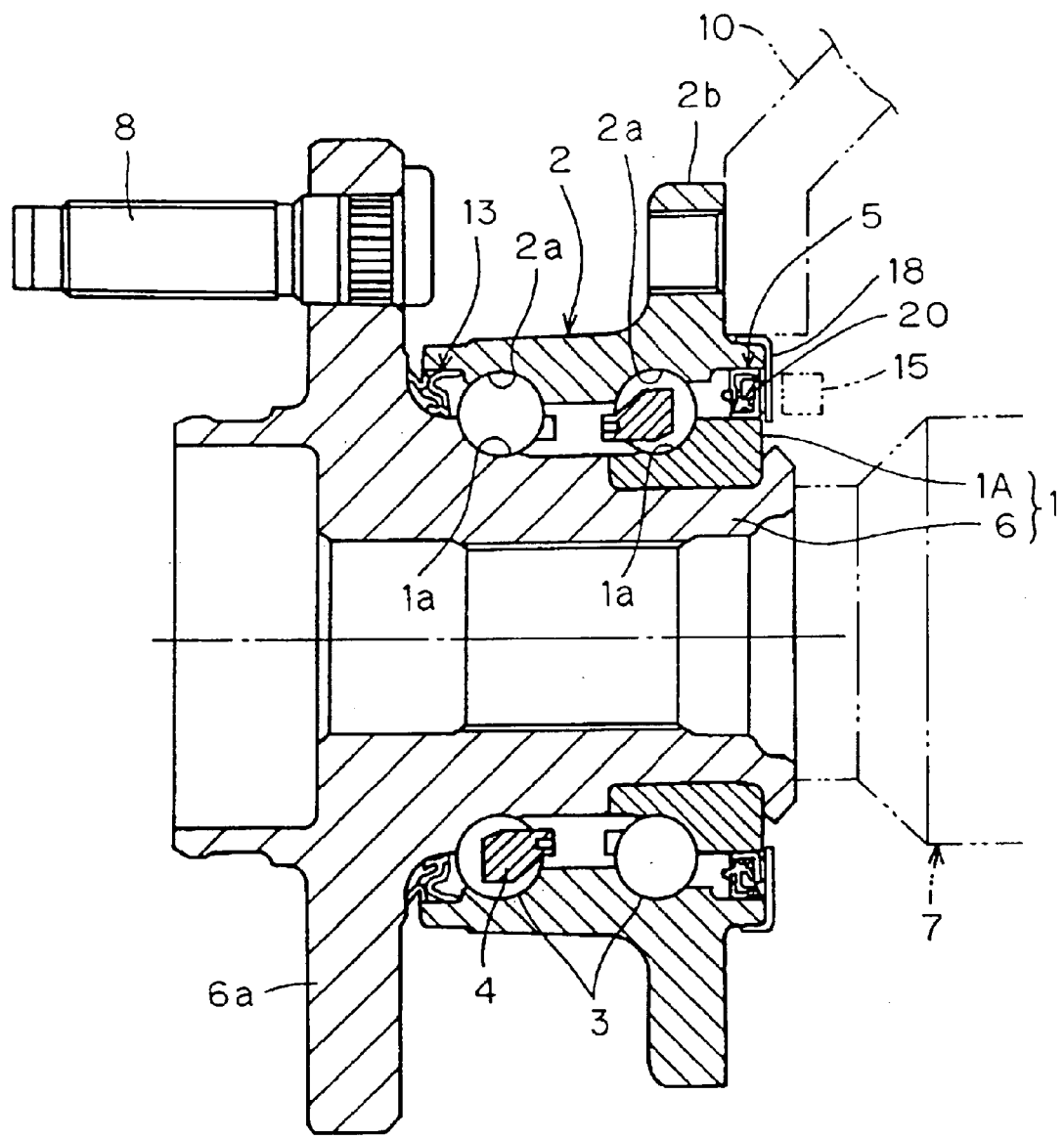
FIG. 1 is a longitudinal sectional view of a wheel support system employing wheel support bearing assembly according to a first preferred embodiment of the present invention.
Figure 2:
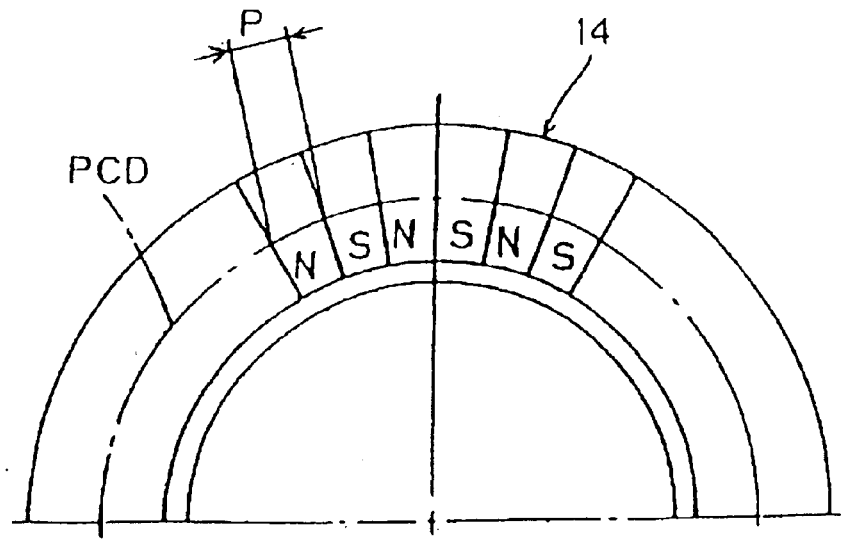
FIG. 2 is a fragmentary front elevational view of a multi-pole magnet used in the wheel support bearing assembly of FIG. 1, showing only one of halves of the multi-pole magnet.
Figure 3:
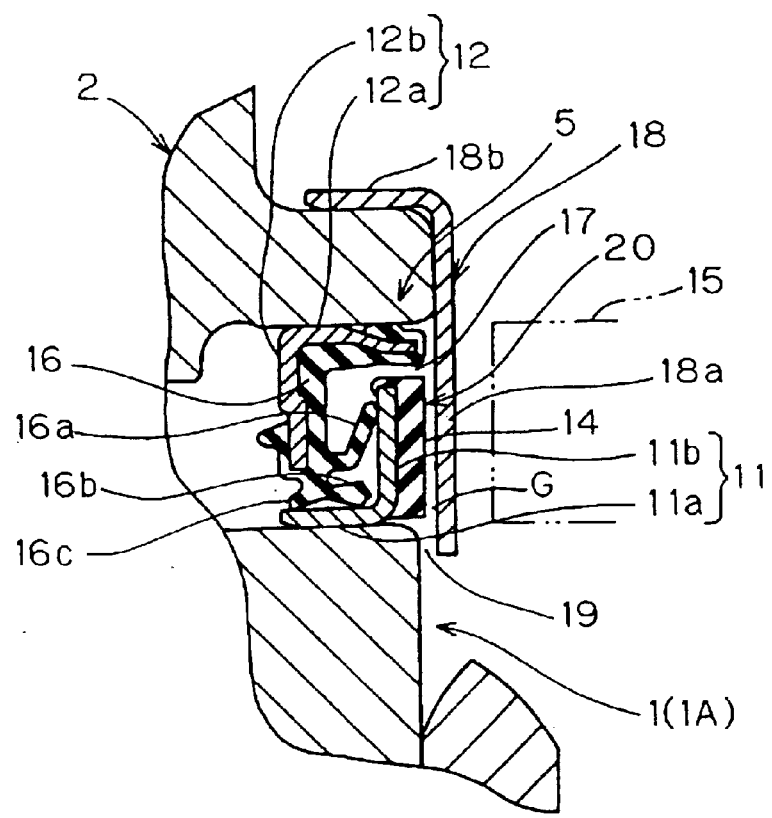
FIG. 3 is a fragmentary longitudinal sectional view, on an enlarged scale, showing an essential portion of the wheel support bearing assembly of FIG. 1.

In the first place, with particular reference to FIGS. 1 to 3 showing a first preferred embodiment of the present invention, the wheel support bearing assembly shown therein will be described in the context of that used for supporting a drive wheel, in which the magnetic encoder concurrently serve as a slinger.

As shown in FIG. 1, the wheel support bearing assembly includes generally cylindrical inner and outer members 1 and 2 one positioned radially inside the other to define an annular bearing space, a plurality of, for example, two, rows of rolling elements 3 interposed between the inner and outer members 1 and 2 and rollingly movably positioned within the annular bearing space, and annular sealing devices 5 and 13 accommodated within and positioned adjacent opposite ends of the annular space, respectively, to seal the annular bearing space. It is to be noted that one of the sealing devices, that is, the sealing device 5 is provided with a magnetic encoder 20 as will be described later.

Each of the inner and outer members 1 and 2 has a raceway 1a or 2a defined therein in the form of a generally semicircular sectioned groove. The inner and outer members 1 and 2 are positioned radially inwardly and outwardly of the dual rows of the rolling elements 3 and are rotatable relative to each other through the rolling elements 3 of those rows. The inner and outer members 1 and 2 may be bearing inner and outer races, respectively. Depending on the application, the inner member 1 may be a part of a shaft rotatable relative to the outer member 2. Also, each of the rolling elements 3 of those rows may be either a ball or a roller, but the ball is shown as used therefore throughout the specification.

The wheel support bearing assembly shown therein is of a type generally referred to a dual row rolling bearing and, more particularly, as a double row angular contact ball bearing assembly. This wheel support bearing assembly may also be referred to as a third generation bearing assembly wherein the bearing inner race is made up of a barrel hub 6 and a separate inner race 1A mounted externally on one end of the barrel hub 6 and wherein inner raceways 1a and 1a for the respective rows of the rolling elements 3 are defined on an outer peripheral surface of the barrel hub 6 and that of the separate inner race 1A, respectively.

The barrel hub 6 has one end drivingly coupled with one end (for example, an outer race) of a constant speed universal joint 7 and, on the other hand, the opposite end of the barrel hub 6 is formed integrally with a radially outwardly extending hub flange 6a to which a wheel (not shown) can be secured by means of a plurality of bolts 8. The opposite end (for example, an inner race) of the constant speed universal joint 7 may be drivingly coupled with a drive wheel (not shown). On the other hand, the outer member 2 is in the form of a bearing outer race having a radially outwardly extending mounting flange 2b through which the wheel support bearing assembly can be secured to a housing 10 such as, for example, a knuckle. This outer member 2 has its inner peripheral surface formed with outer raceways 2a and 2a defined in face-to-face relation with the inner raceways 1a and 1a on the inner member 1. Each row of the rolling elements 3 are movably retained by a ring-shaped retainer or cage 4. One end of the annular bearing space that is delimited between the separate inner race 1A and the outer member 2 is sealed by the previously described sealing device 5 positioned adjacent a connection between the wheel support bearing assembly and the constant speed universal joint 7, whereas the opposite end of the annular bearing space that is delimited between the outer member 2 and the barrel hub 6 is sealed by the separate sealing device 13.

FIG. 3 illustrates the encoder-equipped sealing device 5 on an enlarged scale. As best shown therein, this sealing device 5 includes first and second annular sealing plates 11 and 12 press-fitted onto an outer periphery of the inner member 1 and into a bore of the outer member 2, respectively. Each of the first and second sealing plates 11 and 12 has a generally L-shaped section delimited by a cylindrical wall 11a or 12a and a radial upright wall 11b or 12b lying perpendicular to the cylindrical wall 11a or 12a.

The first sealing plate 11 is mounted on one of the inner and outer members 1 and 2 that serves as a rotating member, for example, the inner member 1 so far shown, and serves as a slinger. With the cylindrical wall 11a of the first sealing plate 11 press-fitted on the inner member 1 for rotation therewith, the radial wall 11b thereof is, while extending radially outwardly of the inner member 1, positioned adjacent an opening of the annular space adjacent the constant speed universal joint 7 (see FIG. 1), and an annular multi-pole magnet 14 is fixed to one of opposite surfaces of the radial wall 11b remote from the radial wall 12b of the second sealing plate 12. This multi-pole magnet 14 cooperates with the first sealing plate 11 to form a magnetic encoder 20 and has a plurality of magnetic poles N and S, as shown in FIG. 2, that are laid so as to alternate in a direction circumferentially thereof. As shown in FIG. 2, the magnetic poles of the same polarity S or N are spaced circumferentially equidistantly at intervals of a predetermined pitch p to depict a pitch circle PCD coaxial with the first annular sealing plate 11. In face-to-face relation with the multi-pole magnet 14 of the magnetic encoder 20, a magnetic sensor 15 is positioned as best shown in FIG. 3 to thereby complete a rotary encoder assembly for detecting the number of revolutions of the wheel. It is to be noted that the magnetic sensor 15 is fixedly carried by an automotive body structure.

The multi-pole magnet 14 discussed above may be either a magnet made of an elastic material such as a rubber or a plastics material mixed with a powdered magnetic material, or a sintered magnet. Where the multi-pole magnet 14 is in the form of a rubber magnet, the multi-pole magnet 14 can be bonded by vulcanization to the radial wall 11b of the first sealing plate 11. Specific examples of the material for the multi-pole magnet 14 will be discussed in detail later and any of them can be conveniently and equally employed in the practice of the various preferred embodiments of the present invention.

The second annular sealing plate 12 has an annular elastic sealing strip 16 secured by vulcanization thereto. The elastic sealing strip 16 is of one-piece construction including a side sealing lip 16a slidingly engaged with the radial wall 11b of the first sealing plate 11, and oppositely extending radial sealing lips 16b and 16c slidingly engaged with the cylindrical wall 11a of the first sealing plate 11. The second sealing plate 12 holds the elastic sealing strip 16 at a location where the second sealing plate 12 is mounted inside the outer member 2 that serves as a stationary member. A free end of the cylindrical wall 12a of the second sealing plate 12 is spaced a slight radial distance from a radially outward edge of the radial wall 11b of the first sealing plate 11 to define therebetween a gap which serves as a labyrinth seal 17.

An annular protective cover 18 made of non-magnetic material is capped onto that end of the outer member 2 adjacent the constant speed universal joint 7 and positioned axially outwardly of the multi-pole magnet 14 and between the multi-pole magnet 14 and the magnetic sensor 15 so that an annular air gap G of a predetermined size can be defined between the annular protective cover 18 and an outer surface of the multi-pole magnet 14 adjacent the magnetic sensor 15. Because of the intervention of the protective cover 18, the magnetic sensor 15 responds to alternate passage of the magnetic poles of the multi-pole magnet 14 through the protective cover 18 to thereby detect the number of revolutions of the wheel.

In any event, the protective cover 18 is a generally L-shaped section including a ring-shaped wall 18a and an axially extending cylindrical wall 18b lying perpendicular to the annular wall 18a and is secured to one of the inner and outer members 1 and 2 that serves as the stationary member, that is, the outer member 2 with the cylindrical wall 18b mounted on the outer periphery of the outer member 2 under interference fit with the ring-shaped wall 18a positioned between the multi-pole magnet 14 and the magnetic sensor 15 in the manner described above. The ring-shaped wall 18a of the protective cover 18 is so shaped and so sized as to extend radially inwardly from the cylindrical wall 18b to a position confronting an annular end face of the inner member 1, which serves as the rotating member, to thereby define a labyrinth gap 19 between an inner peripheral edge of the ring-shaped wall 18a and that end face of the inner member 1.

In the wheel support bearing assembly so constructed as described above in accordance with the preferred embodiment of the present invention, since the multi-pole magnet 14 made of the elastic material mixed with the powdered magnetic material is bonded by vulcanization to the radial wall 11b of the first sealing plate 11 to provide the magnetic poles N and S alternating in the circumferential direction thereof, the multi-pole magnet 14 and the first sealing plate 11 altogether constitute the magnetic encoder 20 necessary to permit the magnetic sensor 15 to detect the number of revolutions of the wheel. Although the protective cover 18 intervenes between the magnetic encoder 20 and the magnetic sensor 15, since the protective cover 18 is made of a non-magnetic material, magnetic fluxes emanating from the multi-pole magnet 14 towards the magnetic sensor 15 are not disturbed and, therefore, no sensor performance of the magnetic sensor 15 to detect the number of revolutions of the wheel will be adversely affected.

With respect to sealing between the inner and outer members 1 and 2, this can be accomplished principally by the sealing lips 16a to 16c of the sealing strip 16 secured to the second sealing plate 12 that are slidingly engaged with the first sealing plate 11, and the labyrinth seal 17 defined by the free edge of the radial wall 11b of the first sealing plate 11 that is spaced the slight distance radially inwardly from the cylindrical wall 12a of the second sealing plate 12. Also, since the labyrinth gap 19 is defined between the inner member 1 and the protective cover 18, the presence of the protective cover 18 will not interfere with rotation of the rotating member, that is, the inner member 1 and any possible ingress of foreign matter into the bearing assembly through between the inner member 1 and the protective cover 18 can be effectively avoided to thereby increase the sealability.

With the wheel support bearing assembly of the structure described above, since the protective cover 18 made of the non-magnetic material intervenes between the magnetic sensor 15 and the multi-pole magnet 14 forming a part of the magnetic encoder 20, any possible nipping or biting of foreign matter between the multi-pole magnet 14 and the magnetic sensor 15 can be effectively avoided. Even if the foreign matter is caught in between the multi-pole magnet 14 and the magnetic sensor 15, the foreign matter will not contact the multi-pole magnet 14 and the possibility would hardly occur that the multi-pole magnet 14 forming a part of the magnetic encoder 20 will be damaged. Specifically, since the magnetic sensor 15, particularly a casing therefor is generally made of a material harder than rubber or the like, a problem associated with a possible damage to the magnetic sensor 15 resulting from biting of the foreign matter may be minimal.

Also, since the protective cover 18 is fitted to the outer member 2 that serves as the stationary member, the protective cover 18 does not rotate and, therefore, there is no possibility that the foreign matter may be entangled in between the protective cover 18 and the magnetic sensor 15 which would otherwise occur when the protective cover 18 rotates. The presence of the air gap G of a predetermined size between the protective cover 18 and the magnetic sensor 15 allows the protective cover 18 not to disturb rotation of the multi-pole magnet 14 and, hence, that of the inner member 1 carrying the multi-pole magnet 14. Considering that the magnetic sensor 15 may be brought to a position where it contacts the protective cover 18, the air gap G between the magnetic sensor 15 and the multi-pole magnet 14 can be considerably easily adjusted. In addition, since the protective cover 18 is mounted externally on the outer member 2 so as to cover a free end face thereof adjacent the magnetic sensor 15, unlike the case in which the protective cover is mounted internally in a bore of the outer member 1, no extra space for receiving the protective cover 18 is necessary in that end of the annular space between the inner and outer members 1 and 2 and, therefore, a sufficient sectional height of the sealing device 5 formed by the first and second sealing plates 11 and 12 can be advantageously be secured.

Figure 4:
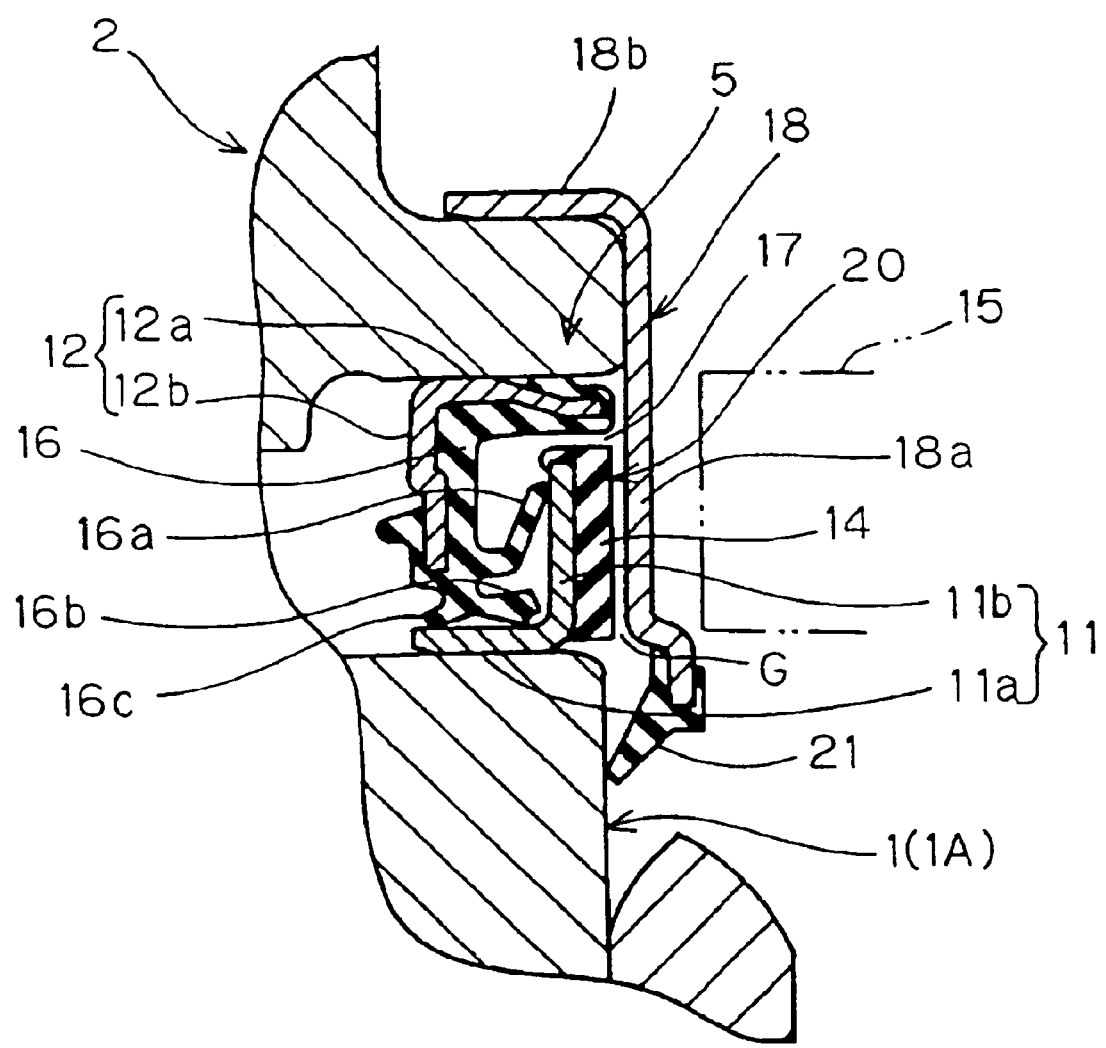
FIG. 4 is a view similar to FIG. 3, showing a first variation of the wheel support bearing assembly of FIG. 1.

FIG. 4 illustrates a first variation of the wheel support bearing assembly according to the foregoing embodiment. In this variation shown in FIG. 4, an annular exterior sealing lip 21 is integrally formed with an inner peripheral edge of the annular protective cover 18 so as to be slidingly engaged with an annular end face of the inner member 1 serving as the rotating member. This exterior sealing lip 21 is made of an elastic material such as rubber material similar to or the same as the material for the sealing strip 16 including the side sealing lip 16a and the radial sealing lips 16b and 16c and is integrated with the protective cover 18 by the use of a vulcanizing technique. In order to facilitate mounting of the exterior sealing lip 21 on the protective cover 18 in the manner described above, an inner peripheral edge portion of the protective cover 18 is so shaped and so configured as to represent a stepped tongue separate a distance axially away from the inner member 1. The exterior sealing lip 21 is thus fitted to the stepped tongue so as to extend towards the annular end face of the inner member 1 for sliding engagement therewith. Although in this variation shown in FIG. 4 no labyrinth seal is defined between the inner peripheral edge of the protective cover 18 and the annular end face of the inner member 1 such as in the embodiment shown in FIGS. 1 to 3, the sliding engagement between the exterior sealing lip 21 and the annular end face of the inner member 1 serves the purpose of sealing.

Other structural features of the wheel support bearing assembly employing this variation than those described above are similar to those shown in and described with reference to FIGS. 1 to 3 and, therefore, the details thereof are not reiterated for the sake of brevity.

The use of the exterior sealing lip 21 on the protective cover 18 provides a physical contact seal between the inner member 1 and the protective cover 18 and can, therefore, provide an enhanced sealing performance, as compared with the labyrinth seal, to avoid any possible ingress of foreign matter such as dusts into the wheel support bearing assembly which would otherwise take place through a gap between the protective cover and the rotating member, that is, the inner member 1.

Figure 5:
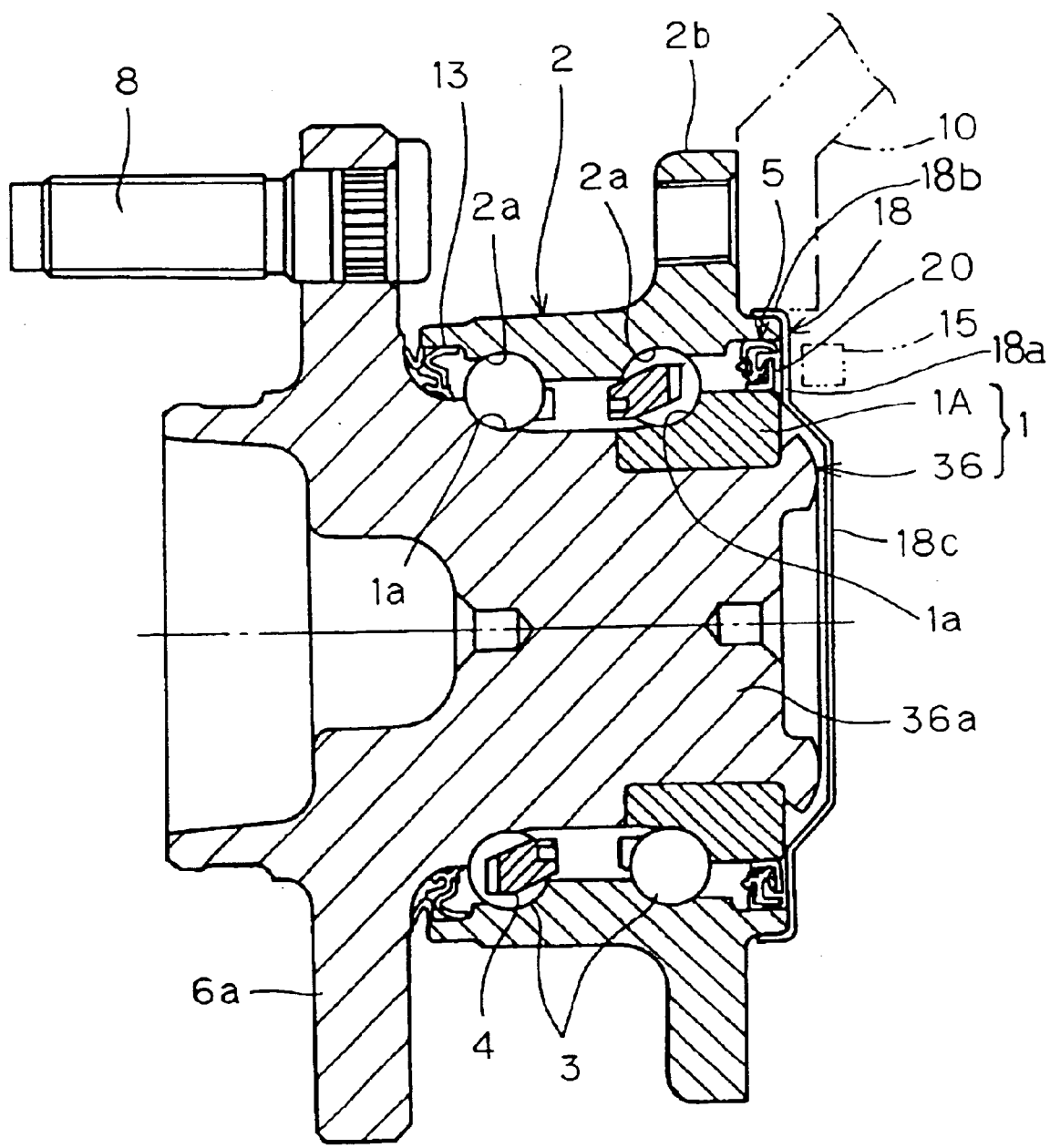
FIG. 5 is a longitudinal sectional view showing a wheel support system employing a second variation of the wheel support bearing assembly of FIG. 1.
Figure 6:
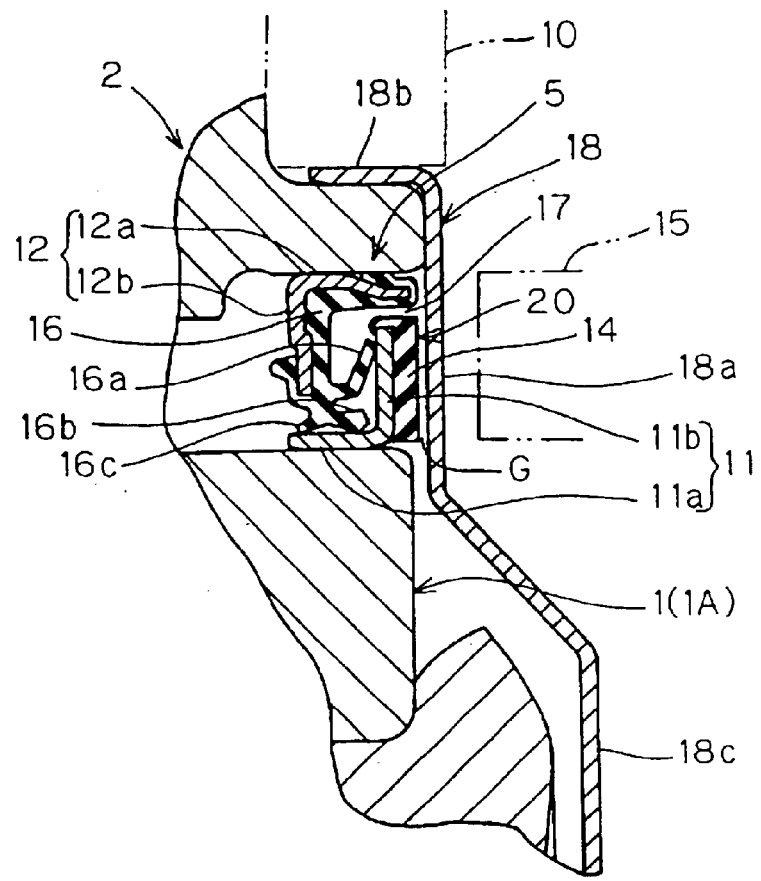
FIG. 6 is a fragmentary longitudinal sectional view, on an enlarged scale, showing an essential portion of the wheel support bearing assembly of FIG. 5.

FIGS. 5 and 6 illustrate a second variation of the wheel support bearing assembly according to the foregoing embodiment. It is, however, to be noted that the wheel support bearing assembly designed according to this variation of FIGS. 5 and 6 is shown as used to rotatably support a driven wheel. Even in this second variation, the magnetic encoder is of a type concurrently serving as a sealing slinger, wherein a barrel hub 36 forming a part of the inner member 1 has a shank 36a that is not coupled with any constant speed universal joint such as employed in the foregoing embodiment of FIGS. 1 to 3.

The protective cover 18 shown in FIGS. 5 and 6 is of a shape generally similar to the shape of a dish and includes a substantially annular flat rim 18a, a cylindrical wall 18b continued from and lying generally perpendicular to the annular flat rim 18a, and a cover wall 18c continued radially inwardly from the annular flat rim 18a and stepped relative to the annular flat rim 18a so as to protrude in a direction counter to the direction in which the cylindrical wall 18b protrudes. This dish-shaped protective cover 18 is capped onto the outer member 2 with the cylindrical wall 18b press-fitted onto the outer member 2 as is the case with that in the foregoing embodiment, so that the annular flat rim 18a thereof confronts the elastic member 14 and the cover wall 18c covers an outer end face of the shank 36a of the inner member 1 adjacent the automotive body structure. In this variation shown in FIGS. 5 and 6, other structural features of the wheel support bearing assembly employing this variation, including the inner and outer members 1 and 2 serving as the rotating and stationary members, respectively, than those described above are similar to those shown in and described with reference to FIGS. 1 to 3 and, therefore, the details thereof are not reiterated for the sake of brevity.

According to the second variation shown in and described with reference to FIGS. 5 and 6, the protective cover 18 concurrently serves as a lid covering that end face of the inner member 1 serving as the rotating member and, therefore, no extra or dedicated lid for covering the inner member 1 is needed and, hence, the number of component parts required can be reduced correspondingly. In other words, by providing an end cover hitherto employed for covering the end face of the inner member with an annular protective element that serves as a protective cover for covering the multi-pole magnet 14, the end cover can be utilized to concurrently serve as the protective cover and, therefore, no protective cover dedicated solely for the multi-pole magnet 14 can be needed. Also, since the protective cover 18 shown in and described with reference to FIGS. 5 and 6 covers not only the open end of the annular space between the inner and outer members 1 and 2, but also that end face of the inner member 1, the sealability can be increased conveniently.

Figure 7:
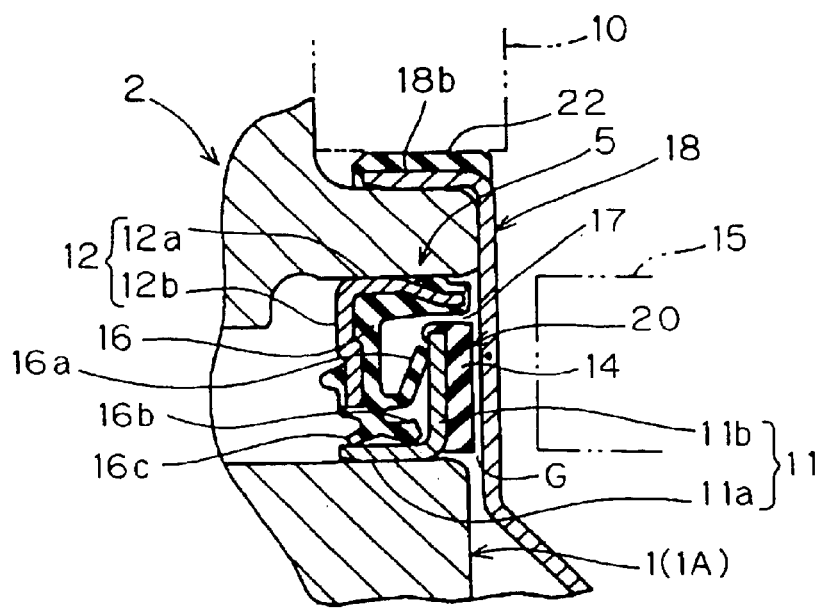
FIG. 7 is a view similar to FIG. 6, showing a third variation of the wheel support bearing assembly of FIG. 1.

A third variation of the wheel support bearing assembly according to the first embodiment is shown in FIG. 7. In this variation, a mounting portion of the protective cover 18, that is, the cylindrical wall 18b is integrated with an annular sealing rubber sheet 22. More specifically, the sealing rubber sheet 22 has a width slightly greater than the axial length of the cylindrical wall 18b so that it can encompass not only an outer peripheral surface of the cylindrical wall 18b, but can also be turned up to cover a free end portion of the cylindrical wall 18b. Integration of this annular sealing rubber sheet 22 with the cylindrical wall 18b of the protective cover 18 is carried out by, for example vulcanization. The housing 10 that is connected with the mounting flange 2b integral with the outer member 2 is mounted on the outer member 2 with the sealing rubber sheet 22 intervening between the housing 10 and the cylindrical wall 18b of the protective cover 18.

The use of the sealing rubber sheet 22 on the protective cover 18 to establish a tightly seal between the outer member 2 and the housing 10 is effective to avoid any possible ingress of dusts into the bearing assembly through a mounting position where the protective cover 18 is mounted, to thereby enhance the sealing performance of the wheel support bearing assembly.

Other structural features of the wheel support bearing assembly employing this variation than those described above are similar to those shown in and described with reference to FIG. 6 and, therefore, the details thereof are not reiterated for the sake of brevity.

Figure 8:
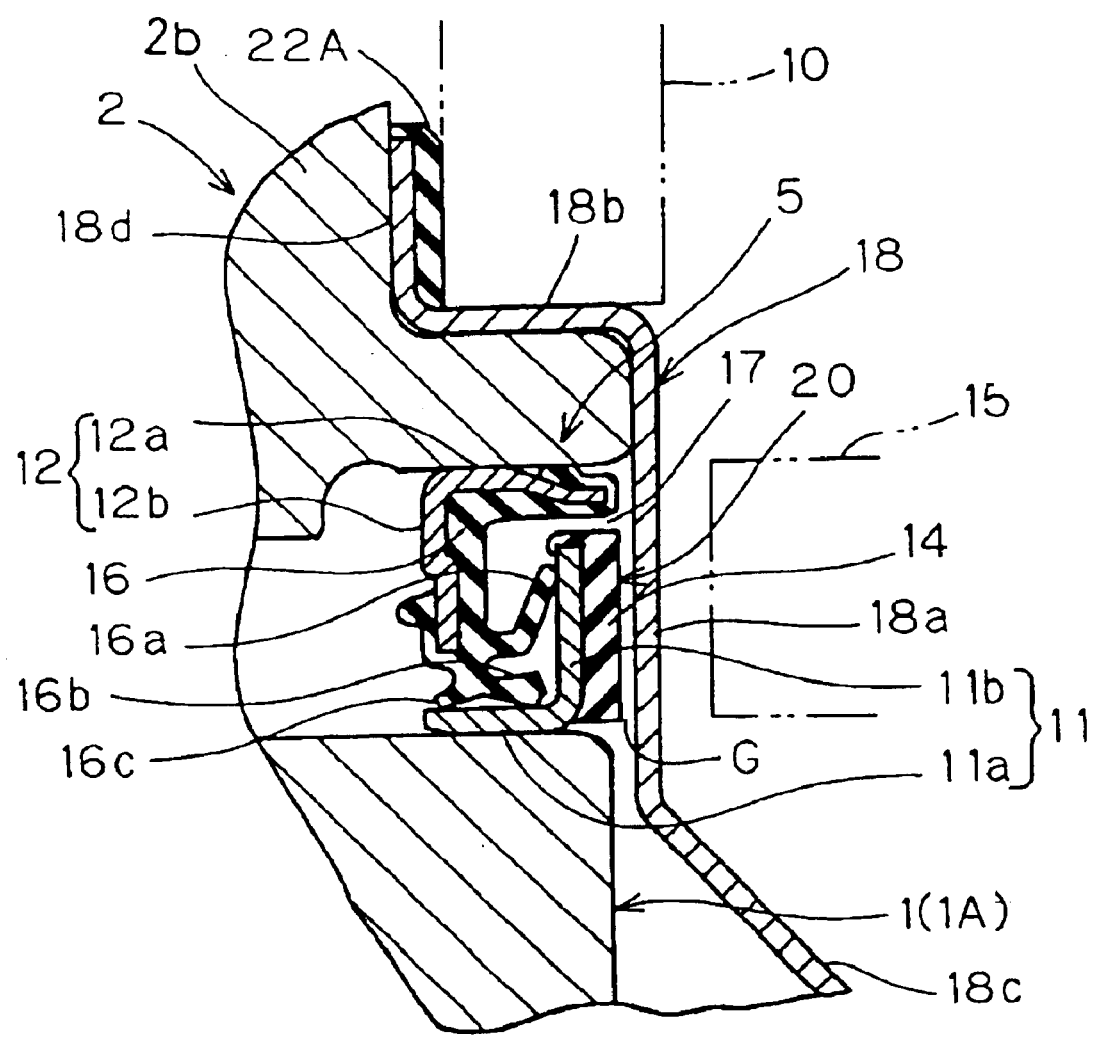
FIG. 8 is a view similar to FIG. 6, showing a fourth variation of the wheel support bearing assembly of FIG. 1.

FIG. 8 illustrates a fourth variation of the wheel support bearing assembly according to the first embodiment. The protective cover 18 employed in this fourth variation shown in FIG. 8 is substantially similar to that used in the previously described third variation of the wheel support bearing assembly, except that the protective cover 18 is additionally provided with a radially outwardly extending flange 18d integral with and extending radially outwardly from a free end of the cylindrical wall 18b. The annular sealing rubber sheet 22A is secured by vulcanization to an annular side face of the radially outwardly extending flange 18d so that when the wheel support bearing assembly is to be connected with the housing 10 through the mounting flange 2b, the sealing rubber sheet 22A can be held in tight contact with a surface area of the housing 10 that is oriented axially of the wheel support bearing assembly to thereby establish a tight seal between the outer member 2 and the housing 10.

It is to be noted that the sealing structure in which the annular sealing rubber sheet 22 or 22A such as employed in any one of the variations shown respectively in FIGS. 7 and 8 is employed to establish the tight seal between the outer member 2 and the housing 10 can be equally applied even where the wheel support bearing assembly is intended for use in supporting the drive wheel.

Second Embodiment

The wheel support bearing assembly according to a second preferred embodiment of the present invention will now be described with reference to FIGS. 9 and 10. As is the case with the first embodiment of the present invention, the wheel support bearing assembly according to this embodiment is assumed as used for the support of the drive wheel and is thus similar in structure and function to that according to the first embodiment, except for the difference residing in that while the wheel support bearing assembly shown in FIGS. 1 to 3 employs the hub assembly of the structure including the barrel hub 6 with one of the inner race integrated therewith and the other inner race 1A, the wheel support bearing assembly reffered to as a first generation and shown in FIGS. 9 and 10 employs a three-component hub assembly of a structure including a barrel hub 6 and split-type inner races 1A and 1B. Other structural features of the wheel support bearing assembly shown in FIGS. 9 and 10 than those described above are substantially similar to those employed in the wheel support bearing assembly of the third generation shown in FIGS. 1 to 4.

Figure 9:
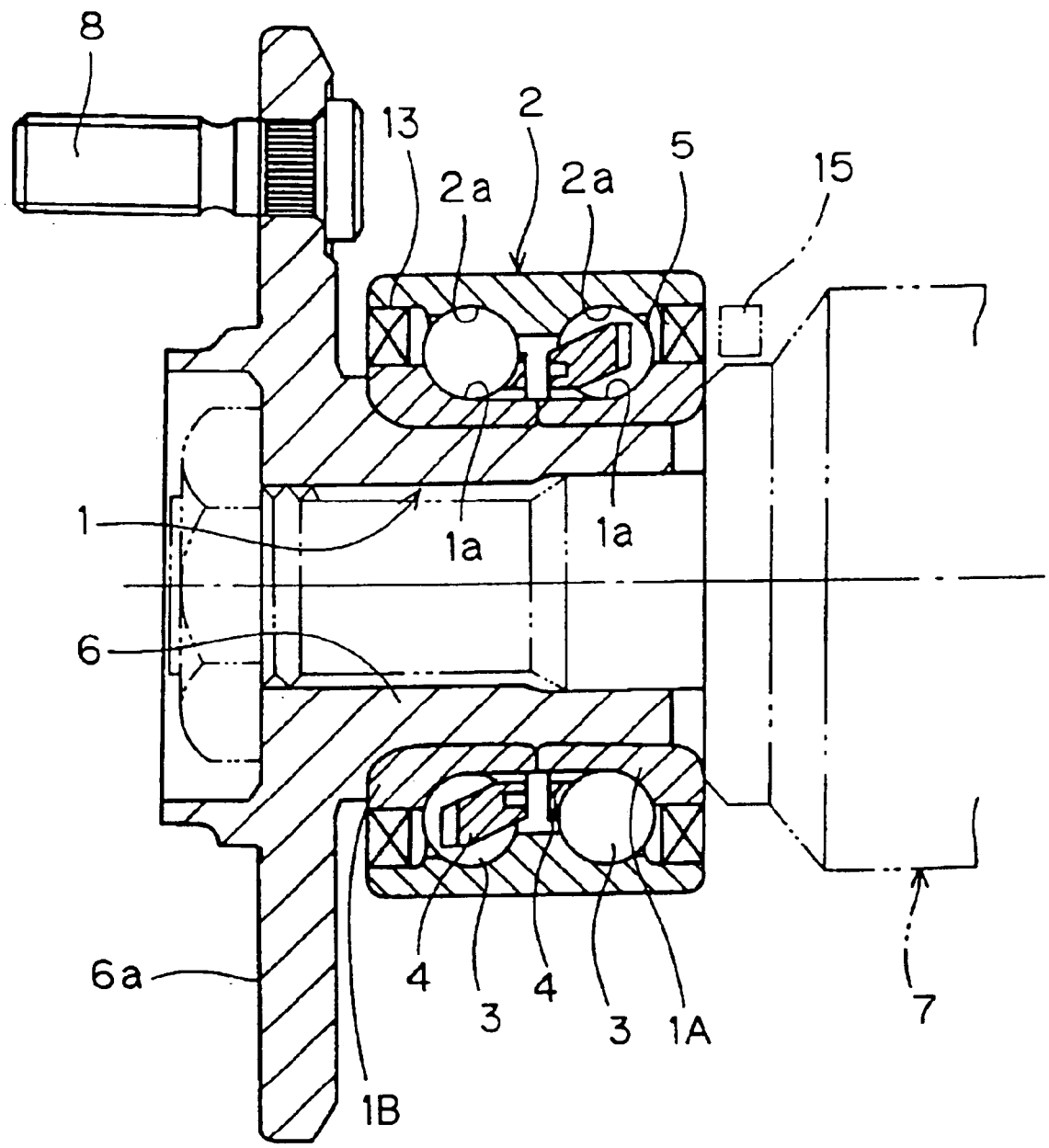
FIG. 9 is a longitudinal sectional view of a wheel support system employing the wheel support bearing assembly according to a second preferred embodiment of the present invention.
Figure 10:
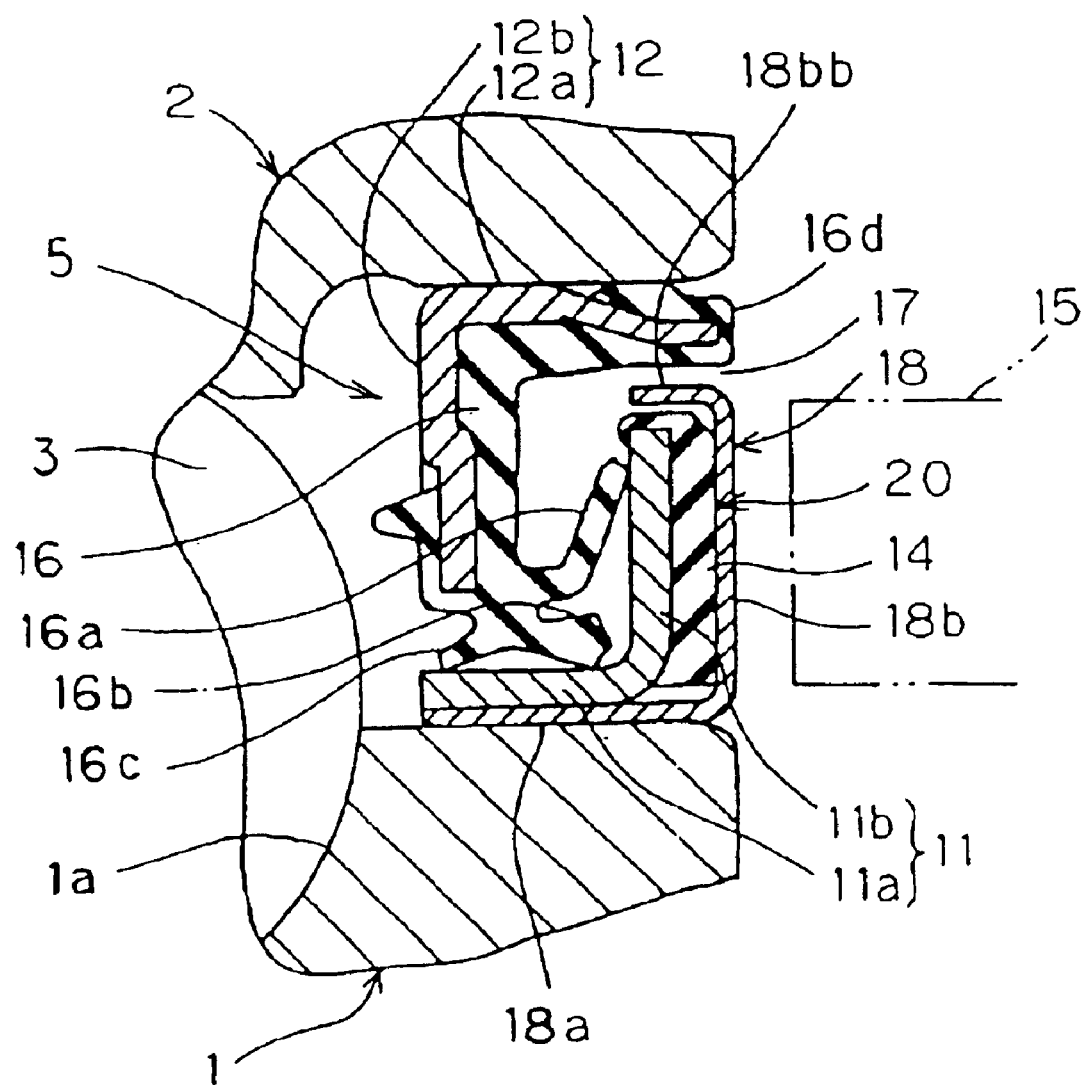
FIG. 10 is a fragmentary longitudinal sectional view, on an enlarged scale, showing an essential portion of the wheel support bearing assembly shown in FIG. 9.

FIG. 10 particularly illustrates a portion of the wheel support bearing assembly of FIG. 9 on an enlarged scale to show the details of the annular sealing device 5 equipped with the magnetic encoder. The multi-pole magnet 14 cooperates with the first sealing plate 11 to form the magnetic encoder 20. The second sealing plate 12 holds the elastic sealing strip 16 at a location where the second sealing plate 12 is mounted inside the outer member 2 that serves as a stationary member. A free end of the cylindrical wall 12a of the second sealing plate 12 is spaced a slight radial distance from a radially outward edge of the radial wall 11b of the first sealing plate 11 to define therebetween a gap which serves as a labyrinth seal 17.

The multi-pole magnet 14 is covered by an annular protective cover 18 made of non-magnetic material. The non-magnetic material forming the protective cover 18 may be either a non-magnetic metal or a synthetic resin. This protective cover 18 includes a cylindrical wall 18a and an upright wall 18b formed integrally with the cylindrical wall 18a so as to represent a generally L-shaped section. This protective cover 18 is carried by the inner member 1 with the cylindrical wall 18a press-fitted onto the outer periphery of the inner member 1 that serves as the rotating member. In this mounted condition, the upright wall 18b of the protective cover 18 is held in contact with an outer side face of the multi-pole magnet 14 that faces towards the outside of the bearing assembly. It is, however, to be noted that the upright wall 18b of the protective cover 18 may be spaced a certain distance from the outer side face of the multi-pole magnet 14. The upright wall 18b of the protective cover 18 has a radial outer edge portion 18bb bent to extend inwardly of the bearing assembly, that is, to extend into the annular space between the inner and outer members 1 and 2 towards the upright wall 12b of the second sealing plate 12 so as to cover an radial outer edge portion of the multi-pole magnet 14. Accordingly, the labyrinth seal 17 referred to hereinbefore is specifically defined by the radial gap between a back-turned portion 16d of the elastic member 16, that holds the cylindrical wall 12a of the second sealing plate 12, and the radial outer bent edge portion 18bb of the protective cover 18.

It is to be noted that the radial outer bent edge portion 18bb of the protective cover 18 may be engaged with an radially outer edge of the radial wall 11b of the first sealing plate 11. Also, as shown in, for example, FIG. 11 as a first variation, the multi-pole magnet 14 may be sealed within a closed chamber defined the first sealing plate 11 and the protective cover 18. This sealed structure with the multi-pole magnet 14 enclosed within the closed chamber can be particularly advantageously employed where the multi-pole magnet 14 employed is in the form of a sintered magnet.

The first sealing plate 11 is secured to the inner member 1 through the protective cover 18 with the cylindrical wall 11a thereof press-fitted onto the outer periphery of the cylindrical wall 18a of the protective cover 18.

In the wheel support bearing assembly of the structure described above, it is to be noted that instead of the multi-pole magnet 14 being fitted to the radial wall 11b of the first sealing plate 11, it may be fitted to one of opposite surfaces of the upright wall 18b of the protective cover 18 facing the annular space between the inner and outer members 1 and 2. Even in this case, where the multi-pole magnet 14 is in the form of a rubber magnet, the multi-pole magnet 14 can be secured by vulcanization to the upright wall 18b of the protective cover 18.

Also, in this wheel support bearing assembly, since the portion laterally outside the multi-pole magnet 14 is covered by the protective cover 18 of the non-magnetic material, even though the foreign matter is caught in between the multi-pole magnet 14 and the magnetic sensor 15, the foreign matter will not directly contact the multi-pole magnet 14 and, therefore, the multi-pole magnet 14 can be advantageously be protected from being damaged.

Since the protective cover 18 is fitted to the inner member 11 serving as the rotating member, there is no need to provide a gap between the protective cover 18 and the multi-pole magnet 14 for permitting a relative rotation. Also, even though the protective cover 18 intervenes between the multi-pole magnet 14 and the magnetic sensor 15, there is no need to increase the distance between the multi-pole magnet 14 and the magnetic sensor 15 for accommodating a tolerance for relative rotation, and there is no possibility that the detection output indicative of the number of revolutions detected will be lowered.

Since the annular protective cover 18 represents a generally L-shaped section and includes the upright wall 18b, used to cover the multi-pole magnet 14, and the cylindrical wall 18a adapted to be mounted under interference fit on the inner member 1 serving as the rotating member, the first sealing plate 11 and the protective cover 18 can be simply, easily and robustly mounted on the inner member 1, serving as the rotating member, within the limited annular space between the inner and outer members 1 and 2.

Figure 12:
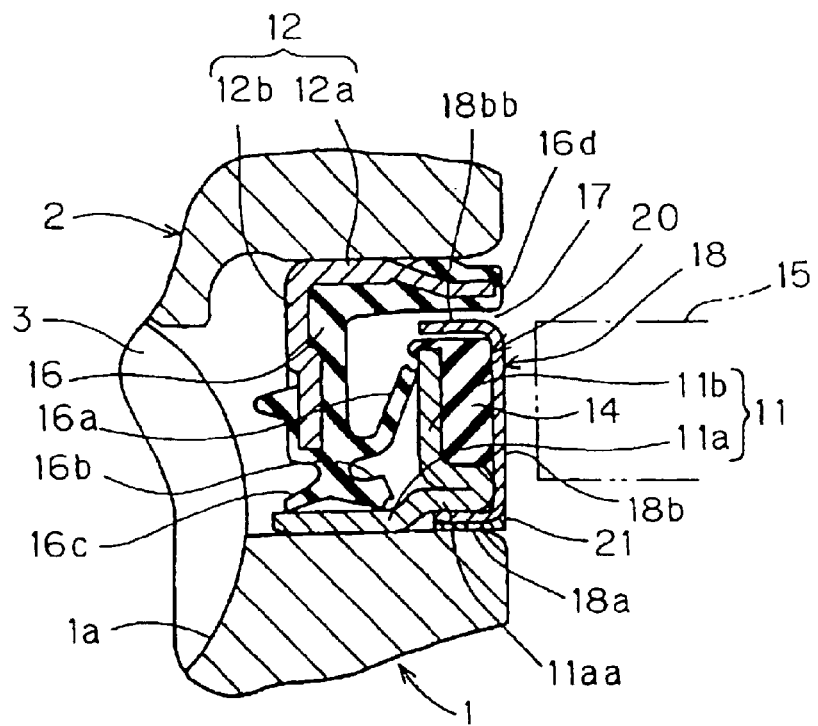
FIG. 12 is a view similar to FIG. 10, showing a second variation of the wheel support bearing assembly of FIG. 9.

FIG. 12 illustrates a second variation of the wheel support bearing assembly according to the second embodiment of the present invention. In this variation shown therein, the first sealing plate 11 is fitted directly to the inner member 1 serving as the rotating member with the cylindrical wall 11a of the first sealing plate 11 press-fitted onto the outer periphery of the inner member 1. A junction between the cylindrical wall 11a and the radial wall 11b of the first sealing plate 11 is so shaped and so configured as to provide a double tongue 11aa that protrudes a distance axially outwardly of the annular space between the first and second members 1 and 2. Specifically, an end portion of the cylindrical wall 11a of the first sealing plate 11 adjacent the radial wall 11b thereof is radially outwardly enlarged to define a radial gap between that end portion of the cylindrical wall 1 and the outer peripheral surface of the inner member 1 and, on the other hand, a radially inner edge portion of the radial wall 11b of the first sealing plate 11 adjacent the cylindrical wall 11a thereof is bent to extend axially outwardly of the annular space between the inner and outer members 1 and 2 so as to overlap that end portion of the cylindrical wall 11a to thereby define the double tongue 11aa as shown. As a matter of course, the radially inner edge portion of the radial wall 11b that is bent in the manner as described is integrally continued to that end portion of the cylindrical wall 11a.

The protective cover 18 is fitted to the inner member 1 through the first sealing plate 11 with the cylindrical wall 18a thereof press-fitted onto the inner periphery of the double tongue 11aa of the cylindrical wall 11a of the first sealing plate 11 so as to be sandwiched between the double tongue 11aa and the inner member 1. An inner peripheral surface of the cylindrical wall 18a of the protective cover 18 is integrally lined by vulcanization with the annular sealing lip 21 made of an elastic material so as to establish a seal between the cylindrical wall 18a of the protective cover 18 and the inner member 1.

Other structural features of the wheel support bearing assembly according to this variation than those described above is similar to those shown in and described with reference to FIG. 2 and FIGS. 9 and 10 and, therefore, the details thereof are not reiterated for the sake of brevity.

Figure 11:
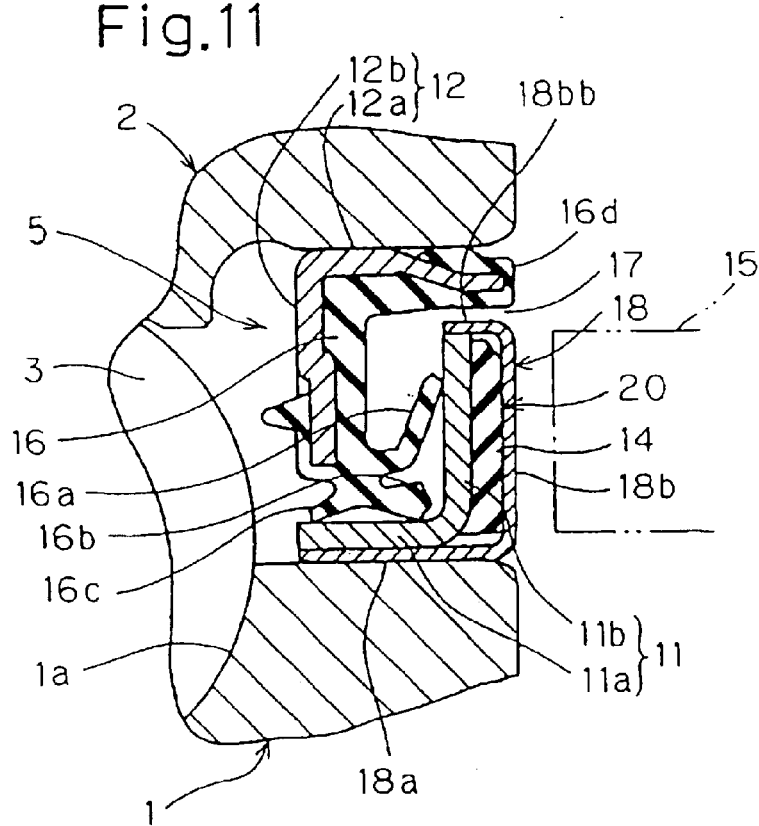
FIG. 11 is a view similar to FIG. 10, showing a first variation of the wheel support bearing assembly of FIG. 9.

According to the variation shown in FIG. 12, since the first sealing plate 11 is directly fitted to the inner member 1 and the protective cover 18 is fitted to the first sealing plate 11, the first sealing plate 11 can advantageously be firmly fixed to the inner member 1 as compared with a double mounting technique shown in FIG. 11. The protective cover 18 if assembled together with the first sealing plate 11 in the manner described above prior to assemblage of the wheel support bearing assembly, can be treated as a single integer including the first seal plate 11 and the protective cover 18.

Also, since the sealing lip 21 made of the elastic material is interposed in a mounting region where the protective cover 18 is mounted on the inner member 1 serving as the rotating member, it is possible to avoid any possible ingress of water and/or dusts into the wheel support bearing assembly through the mounting region where the protective cover 18 is mounted on the inner member 1. The mounting region between the inner member 1 and the first sealing plate 11 is established as an interference fit and, therefore, provides a tight seal, but the presence of the sealing lip 21 provided on the protective cover 18 is effective to increase the sealability.

Figure 13:
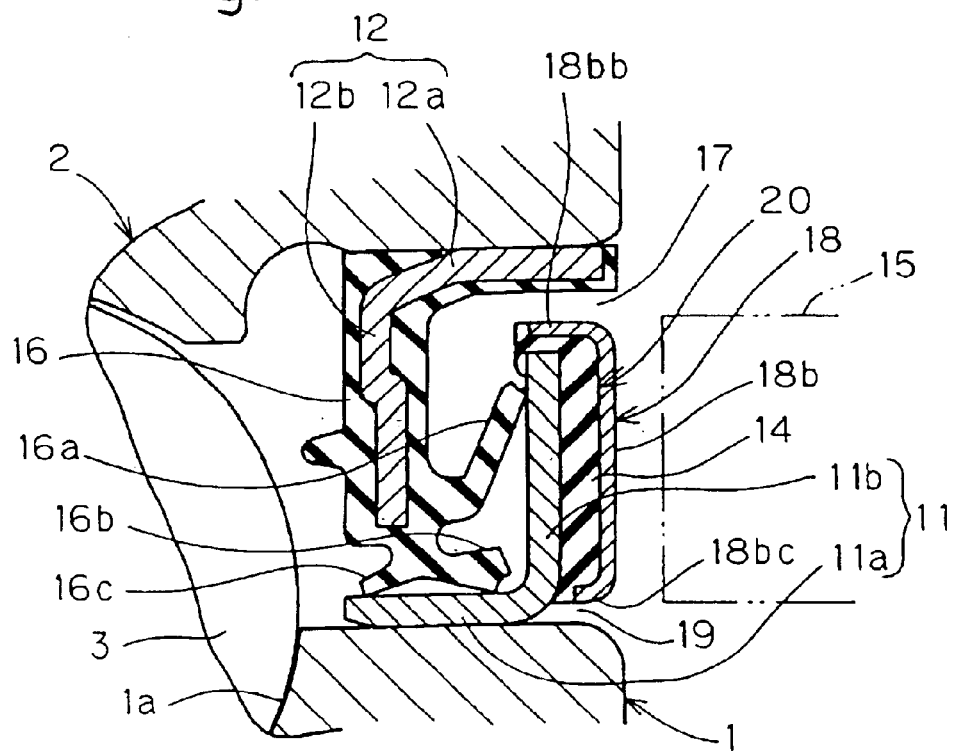
FIG. 13 is a view similar to FIG. 10, showing a third variation of the wheel support bearing assembly of FIG. 9.

A third variation of the second embodiment of the wheel support bearing assembly is shown in FIG. 13. In the third variation, the multi-pole magnet 14 is sandwiched between the radial wall 11b of the first sealing plate 11 and the protective cover 18 while being bonded at its opposite surfaces to the first sealing plate 11 and the protective cover 18, respectively. Where the multi-pole magnet 14 is in the form of the rubber magnet, the opposite surfaces of the multi-pole magnet 14 may be bonded by vulcanization to the radial wall 11b of the first sealing plate 11 and the protective cover 18. In this way, the first sealing plate 11, the multi-pole magnet 14 and the protective cover 18 are integrated together. It is, however, to be noted that the protective cover 18 may be bonded separately to the multi-pole magnet 14. Accordingly, the protective cover 18 can be fitted to the inner member 1 through the multi-pole magnet 14 and the first sealing plate 11.

The radial outer edge portion 18bb of the protective cover 18 employed in this variation merely represents a cylindrical shape, extending axially inwardly of the annular space between the inner and outer members 1 and 2. A radial inner edge portion 18*bc* of the protective cover 18 also extends axially inwardly of the annular space between the first and second members 1 and 2. The labyrinth gap 19 referred to above is defined between the inner edge portion 18*bc* of the protective cover 18 and the outer peripheral surface of the inner member 1. It is to be noted that in this variation the protective cover 18 is not engaged with the first sealing plate 11. Other structural features of the wheel support bearing assembly according to the variation shown in FIG. 13 than those described above are similar to those shown in and described with reference to FIG. 12 and, therefore, the details thereof are not reiterated for the sake of brevity.

According to the third variation shown in FIG. 13, when the multi-pole magnet 14 is to be bonded to the first sealing plate 11, the protective cover 18 can be simultaneously bonded to the multi-pole magnet 14. For this reason, mounting of the protective cover 18 on the inner member 1 serving as the rotating member can advantageously easily be accomplished.

Third Embodiment

Figure 14:
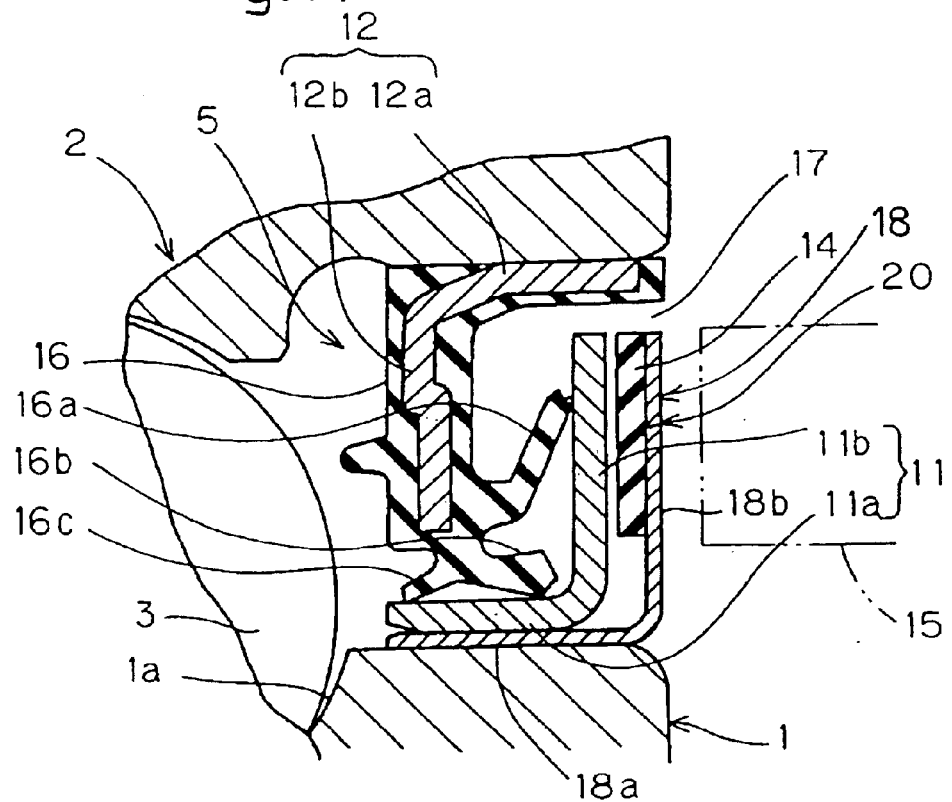
FIG. 14 is a fragmentary longitudinal sectional view of that essential portion of the wheel support bearing assembly according to a third preferred embodiment of the present invention.

The wheel support bearing assembly according to a third preferred embodiment of the present invention will now be described with reference to FIG. 14. The wheel support bearing assembly according to this third embodiment is featured in that the protective cover 18 is fitted to the inner member 11 and that the multi-pole magnet 14 of the magnetic encoder 20 is secured to an axially inner surface of the upright wall 18*b* of the protective cover 18 by means of a bonding technique. Where the multi-pole magnet 14 is in the form of the rubber magnet, it may be secured by vulcanization to the upright wall 18*b* of the protective cover 18. A gap may or may not be formed between the radial wall 11*b* of the first sealing plate 11 and the multi-pole magnet 14. In such case, the multi-pole magnet 14 and the protective cover 18 altogether form the magnetic encoder 20. It is to be noted that in the embodiment shown in FIG. 14, the radial outer edge portion of the upright wall 18*b* of the protective cover 18 does not cover the radial outer edge portion of the radial wall 11*b* of the first sealing plate 11 and that of the multi-pole magnet 14. Other structural features of the wheel support bearing assembly according to the embodiment shown in FIG. 14 than those described above are similar to those shown in and described with reference to FIGS. 10 and 11 and, therefore, the details thereof are not reiterated for the sake of brevity.

According to the third embodiment, the multi-pole magnet 14 forming a part of the magnetic encoder 20 is secured to the upright wall 18*b* of the protective cover 18 and, accordingly, if foreign matter were to be caught in a gap with the magnetic sensor 15, it will be caught in between the upright wall 18*b* of the protective cover 18 and the magnetic sensor 15 and will not directly contact the multi-pole magnet 14. Accordingly, the multi-pole magnet 14 is not damaged by the foreign matter so caught. Since the protective cover 18 is made of the non-magnetic material, the intervention of the protective cover 18 will no longer disturb the detecting operation of the magnetic sensor 15. Also, since the multi-pole magnet 14 is carried by the protective cover 18, the magnetic encoder can be provided for separately from the first and second sealing plates 11 and 12 of the sealing device 5 and, therefore, the sealing device 5 can easily be assembled. It is to be noted that although in the foregoing description a predetermined air gap is provided between the multi-pole magnet 14 and the radial wall 11*b* of the first sealing plate 11, such air gap is not always necessary and the multi-pole magnet 14 and the radial wall 11*b* of the first sealing plate 11 may be held in contact with each other.

Where the multi-pole magnet 14 is in the form of the sintered magnet, and if it is a ferrite magnet, there is no problem associated with rusting of the magnet since ferrite is an iron oxide, but if the multi-pole magnet 14 is a rare earth magnet containing a neodymium system or a samarium system, a rust proofing is necessary.

For rust proofing, as shown in, for example, 15A, the magnetic encoder 20 including the multi-pole magnet 14 may be covered in its entirety by an anticorrosive layer 30, or as shown in FIG. 15B, only the multi-pole magnet 14 may be covered in its entirety by an anticorrosive layer 30. Where the multi-pole magnet 14 is secured to the first sealing plate 11, or the protective cover 18 as shown in FIG. 14, such a rust proofing technique can be equally applied. The anticorrosive layer 30 may be a plated layer or coating, or any other lining layer. A metal plated layer may be any of, for example, a zinc plating, nickel plating or a zinc-nickel plating. Where the anticorrosive layer 30 is employed in the form of the metal plated layer, the possibility can advantageously be avoided which the firmness at the mounting region of the first sealing plate 11 or the protective cover 18 may be reduced which would otherwise result from an elastic deformation of the anticorrosive layer 30. For this reason, the use of the metal plated layer is preferred. Also, where zinc or nickel is plated, the metal plated layer having a high rust proof can be obtained inexpensively.

Other than it, in place of the anticorrosive layer 30 for rust proofing, the multi-pole magnet 14 in the form of the sintered magnet can be sealed within the space defined by the first sealing plate 11 and the protective cover 18 as shown in and described with reference to, for example, FIG. 11 in conjunction with the variation of the first embodiment of FIG. 9.

Fourth Embodiment

The wheel support bearing assembly according to a fourth preferred embodiment of the present invention will hereinafter described with reference to FIGS. 16 to 22.

In FIG. 16, the first sealing plate 11 is fitted directly to the inner member 1 serving as the rotating member, with the cylindrical wall 11*a* of the first sealing plate 11 press-fitted onto the outer periphery of the inner member 1. The multi-pole magnet 14 is secured to the radial wall 11*b* of the first sealing plate 11. The protective cover 18 is a member used to cover an axially outer portion of the multi-pole magnet 14 for protection purpose and is in the form of the non-magnetic plate. Material for the protective cover 10 may be a non-magnetic metal such as, for example, non-magnetic stainless steel. The protective cover 18 is fitted to the inner member 1 through the first sealing plate 11 with radial outer bent edge portion 18*bb* of the protective cover 18 thereof engaged with the radial outer edge of the radial wall 11*b* of the first sealing plate 11. More specifically, the radial outer bent edge portion 18*bb* of the protective cover 18 is crimped over the radial outer edge of the radial wall 11*b* of the first sealing plate 11 over the entire periphery of the radial outer bent edge portion 18*bb* of the protective cover 18. Alternatively, the radial outer bent edge portion 18*bb* of the protective cover 18 may be formed with a plurality of circumferentially spaced pawls which are subsequently crimped to engage the radial outer edge of the radial wall 11*b* of the first sealing plate 11. In any event, the protective cover 18 when so engaged with the first sealing plate 11 in the manner discussed above is held in tight contact with the axially outer surface of the multi-pole magnet 14.

The protective cover 18 employed in this variation has no cylindrical wall such as identified by 18a in connection with the previously described embodiment including its variations and, however, the labyrinth gap 19 is defined between the radial inner edge of the upright wall 18b of the protective cover 18 and the outer peripheral surface of the inner member 1. The radial inner edge of the upright wall 18b of the protective cover 18b may however, be held in contact with the outer peripheral surface of the inner member 1.

According to the variation shown in FIG. 16, since the outer peripheral edge portion of the protective cover 18 is crimped over the outer peripheral edge portion of the radial wall 11b of the first sealing plate 11, the protective cover 18 can easily be mounted on the inner member 1 serving as the rotating member through the first sealing plate 11.

Figure 17:
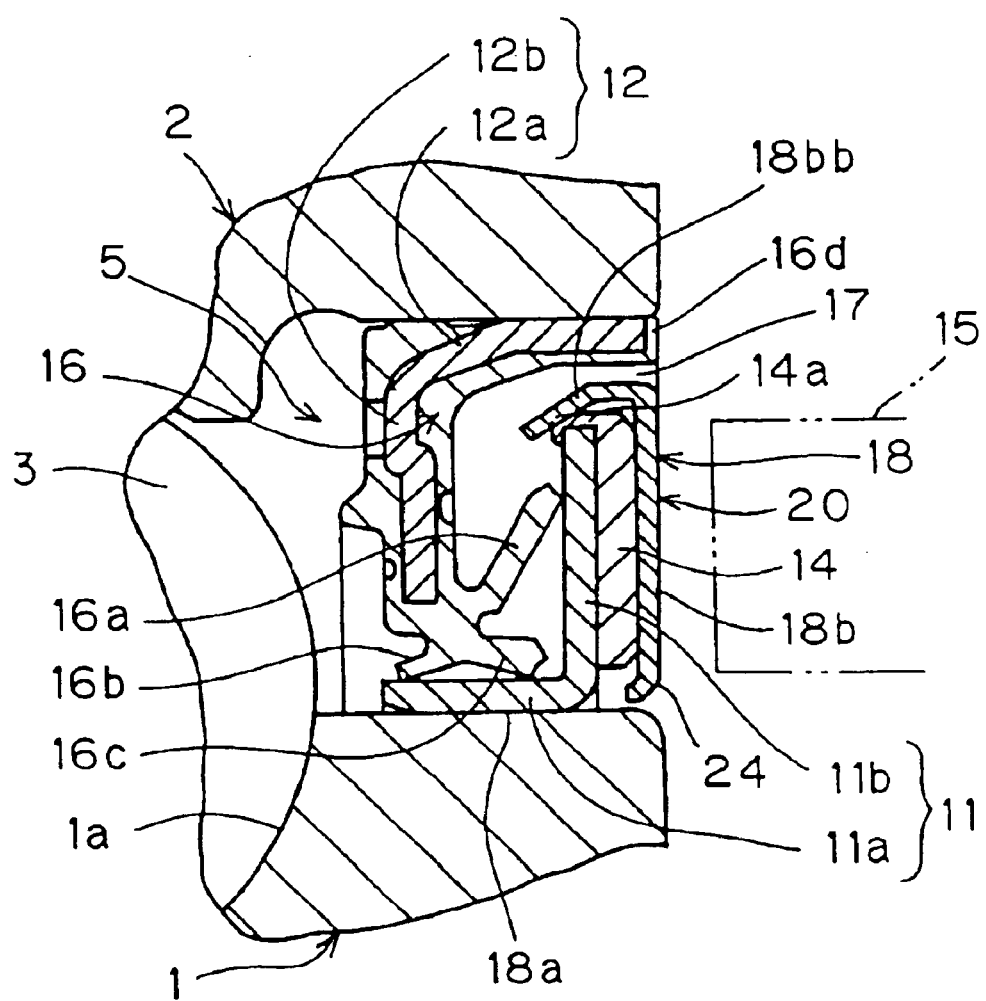
FIG. 17 is a fragmentary longitudinal sectional view showing a first variation of the wheel support bearing assembly of FIG. 16.
Figure 18:
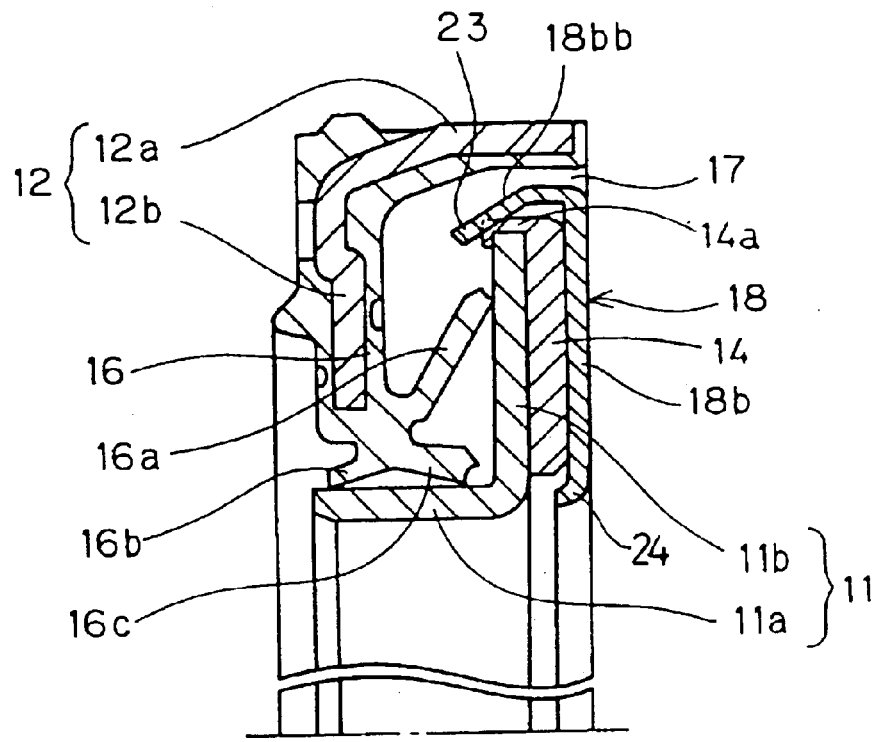
FIG. 18 is a fragmentary longitudinal sectional view, on an enlarged scale, showing the details of an annular sealing device together with the magnetic encoder incorporated therein, both employed in the wheel support bearing assembly of FIG. 17.

FIG. 17 illustrates a first variation of the wheel support bearing assembly according to the fourth embodiment of the present invention. This protective cover 18 includes the upright wall 18b held in tight contact with the outer surface of the multi-pole magnet 14, a radial outer peripheral edge portion of said upright wall 18b being bent axially inwardly of the annular space between the first and second members 1 and 2 to define a peripheral bent edge portion 18bb that is crimped over the outer peripheral edge of the radial wall 11b of the first sealing plate 11. By this crimping of the peripheral bent edge portion 18bb, the protective cover 18 is secured to the first sealing plate 11 while being held in contact with the outer surface of the multi-pole magnet 14. Where the multi-pole magnet 14 has a peripheral cover-up portion 14a overlaying the outer peripheral edge of the radial wall 11b of the first sealing plate 11, the peripheral bent edge portion 18bb of the protective cover 18 is crimped over the outer peripheral edge of the radial wall 11b of the first sealing plate 11 with the peripheral cover-up portion 14a intervening therebetween.

Figure 19:
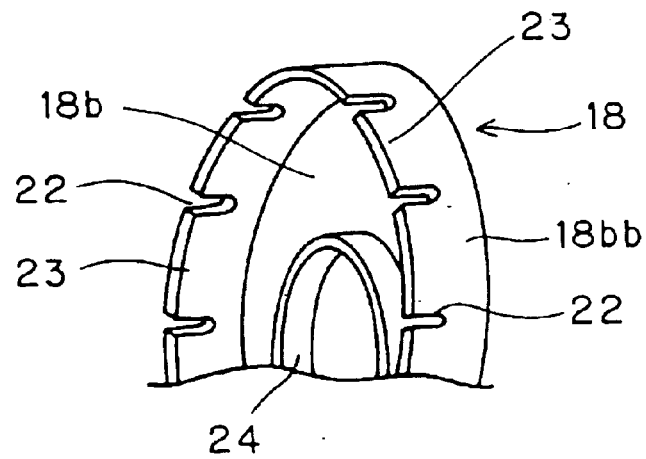
FIG. 19 is a fragmentary perspective view, showing the annular protective cover employed in the magnetic encoder shown in FIG. 18.

The peripheral bent edge portion 18bb of the protective cover 18 represents a cylindrical shape as shown in FIG. 19 before it is bent to crimp over the outer peripheral edge of the radial wall 11b and is formed with a plurality of circumferentially spaced axial cut-outs 22 to define a corresponding number of pawls 23 one positioned between the neighboring axial cutouts 22. Crimping of the peripheral bent edge portion 18bb is carried out by bending those pawls 23 radially inwardly to overlay the outer peripheral edge of the radial wall 11b. Each of the axial cutouts 22 extends a predetermined distance axially that is smaller than the width of the peripheral bent edge portion 18bb so that when the pawls 23 are bent to crimp over the outer peripheral edge of the upright wall 11b an annular root portion of the peripheral bent edge portion 18bb where no axial cutouts 23 are formed and adjacent the upright wall 18b can remain a cylindrical shape while permitting only the pawls 23 to extend slantwise after having been crimped. The pawls 23 so bent to extend slantwise terminate at a location radially inwardly of the radial wall 11b of the first sealing plate 11.

Figure 20A:
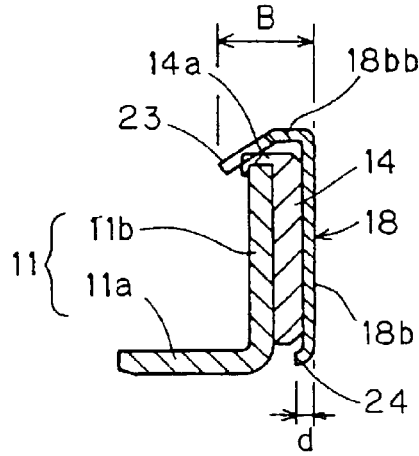
FIG. 20A is a sectional representation showing the annular protective cover of the magnetic encoder in a condition having been mounted.
Figure 20B:
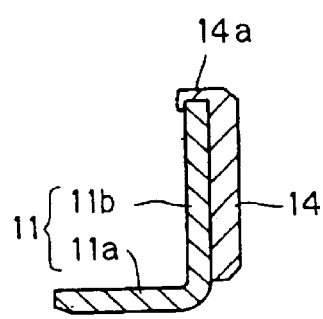
FIG. 20B is a sectional representation showing the annular protective cover of the magnetic encoder in a condition having not yet been mounted.
Figure 20C:
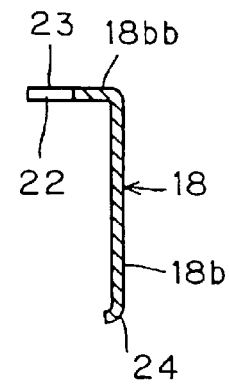
FIG. 20C is a sectional representation showing the annular protective cover of the magnetic encoder in a condition having been crimped.
Figure 21:
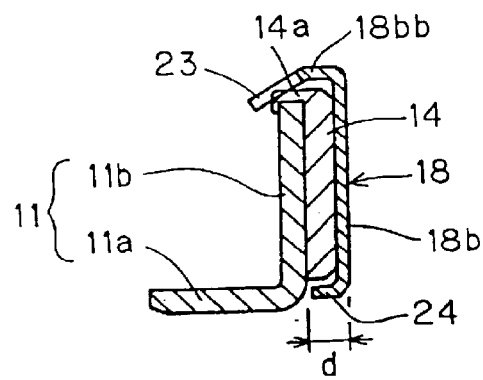
FIG. 21 is a sectional representation, showing a modified form of the magnetic encoder.
Figure 22:
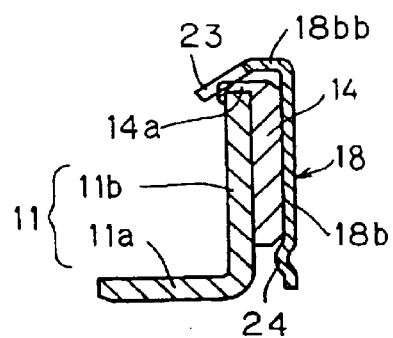
FIGS. 22 is a sectional representation similar to FIG. 20A, showing a modified form of the annular protective cover of the magnetic encoder employed in the wheel support bearing assembly of FIG. 17.
Figure 23:
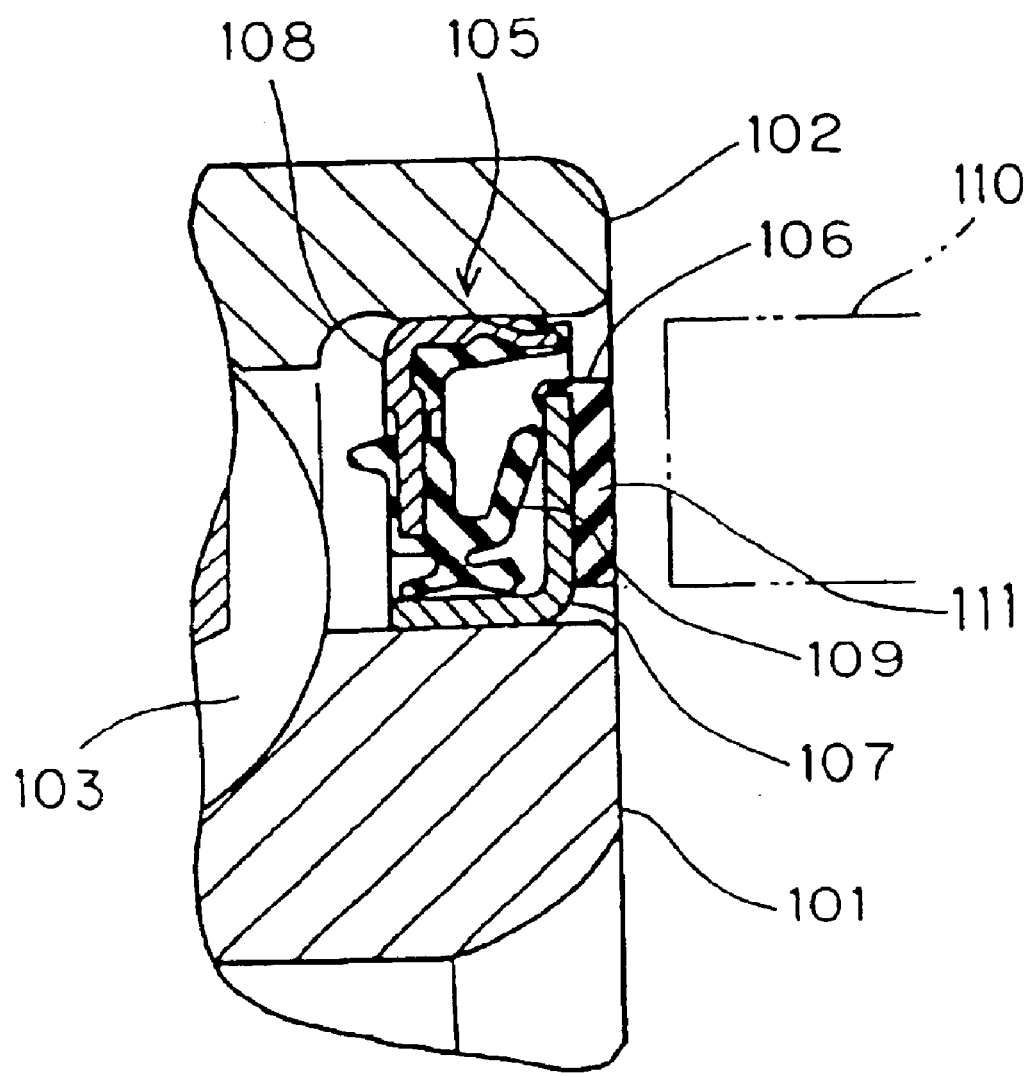
FIG. 23 is a fragmentary longitudinal sectional view of an essential portion of the prior art wheel support bearing assembly.

Specifically, FIG. 20C illustrates the protective cover 18 before the outer peripheral bent edge portion 18bb is crimped; FIG. 20B illustrates the first sealing plate 11 having the radial wall 11b with the multi-pole magnet 14 mounted thereon; and FIG. 20A illustrates the protective cover 18 having been fitted to the assembly of the first sealing plate 11 and the multi-pole magnet 14 with the pawls 23 crimped to interlock the protective cover 18 with the assembly.

It is to be noted that each of the cut-outs 22 may be either a straight slit as shown in FIG. 19 having been delimited by parallel side edges, a groove of a configuration in which the width thereof is greater than the axial depth, or a line cut, i.e., a narrow slit. The depth of each cut-outs 22 may be equal to the entire width of the outer peripheral bent edge portion 18bb, i.e., each cut-out 22 may extend a distance sufficient to reach a junction between the outer peripheral bent edge portion 18bb and the upright wall 18b of the protective cover 18, but that annular root portion of the peripheral bent edge portion 18bb where no axial cut-outs 22 are formed and adjacent the upright wall 18b preferably has a width sufficient to accommodate the thickness of the multi-pole magnet 14 as shown in FIG. 20A.

The inner peripheral edge of the protective cover 18 is formed with a reinforcement rib 24 that preferably extends axially inwardly of the annular space between the first and second members 1 and 2. In the illustrated embodiment, the reinforcement rib 24 has a generally arcuate sectional shape, bent to protrude axially inwardly of the annular space and has a width, indicated by d, corresponding to a fraction of the thickness of the multi-pole magnet 14. This reinforcement rib 24 is positioned radially inwardly of an inner peripheral face of the multi-pole magnet 14.

It is to be noted that the width d of the reinforcement rib 24, as measured in a direction axially of the annular space between the first and second members 1 and 2, may be of a value generally sufficient to cover the thickness of the multi-pole magnet 14. Also, the reinforcement rib 24, instead of representing the arcuate sectional shape, may represent a protruding shape similar to the shape of a countersunk ring as shown in, for example, FIG. 22.

The protective cover 18 is of the structure wherein the outer peripheral bent edge portion 18bb extending from an outer peripheral edge of the upright wall 18b thereof is crimped over the first sealing plate 11 and accordingly, mounting is simple and firm and it is excellent in mass productivity. Since the peripheral bent edge portion 18bb are partly divided into the pawls 23 by the presence of the cut-outs 22, a crimping work can be easily performed since a continued crimping width is narrow. Also, since the protective cover 18 is provided with the reinforcement rib 24 at the inner peripheral edge thereof, any possible deformation of an inner peripheral portion of the protective cover 18 can be avoided when the peripheral bent edge portion 18bb is crimped thereover and, hence, any possible impairment of the bondability of the protective cover 18 to the surface of the multi-pole magnet 14 can be avoided which would otherwise occur upon deformation of the protective cover 18. The gap between the multi-pole magnet 14 and the magnetic sensor 15 facing the multi-pole magnet 14 can have a very small size enough to minimize the magnetic gap to increase the sensitivity. For this reason, if the bondability of the protective cover 18 to the multi-pole magnet 14 is insufficient, interference with the magnetic sensor 15 would eventually occur and the above described gap cannot be set to a very small size. The risk of the interference caused by the insufficient bondability resulting from the crimping work can be avoided by the provision of the reinforcement rib 24 integral with the inner peripheral edge of the protective cover 18.

Material for and dimensions of the protective cover 18 will now be detailed. The material for the protective cover 18 is of a kind non-magnetic and capable of being crimped and may be selected from the group consisting of a non-magnetic stainless steel, aluminum allow and copper alloy. Where the stainless steel is chosen, the protective cover 18 will hardly rust and exhibit a sufficient strength and, accordingly, the non-magnetic stainless steel appears to be a preferred material for the protective cover 18 in terms of rust proof.

The protective cover 18 has a thickness preferably within the range of 0.1 to 1.0 mm. Although the upper limit of the thickness of the protective cover 18 may be any value depending on conditions set for the crimping force, the magnetic gap will enlarge and the magnetic characteristic will be adversely affected if the protective cover 18 has too great a thickness. Accordingly, the upper limit of the thickness of the protective cover 18 is preferably 1.0 mm or less. On the other hand, although in terms of the magnetic gap the thickness of the protective cover 18 is preferably as small as possible, but if it is smaller than 0.1 mm, machining would be difficult to achieve and it may occur that as a result of deformation during the crimping work no sufficient bondability with the multi-pole magnet 14 will be obtained. For this reason, the lower limit of the thickness of the protective cover 18 is 0.1 mm, preferably 0.2 mm and more preferably 0.3 mm.

The protective cover 18 has a Vickers hardness Hv of not greater than 200. If the hardness exceeds Hv 200, there is a possibility that the protective cover 18 may deform during the crimping of the peripheral bent edge portion 18bb. In the case of the stainless steel identified by SUS 304 according to the Japanese Industrial Standards (JIS), the Vickers hardness thereof is not greater than 200. Where the stainless steel is employed, and if no hardening treatment is performed, the protective cover 18 will exhibit a Vickers hardness Hv of 200.

The peripheral bent edge portion 18bb of the protective cover 18 has the axial width B (see FIG. 20A) which is about, for example, 2.45 mm±0.5 mm.

Examples of materials for the multi-pole magnet 14 employed in the practice of any of the first to fourth preferred embodiment of the present invention will now be discussed.

Where the multi-pole magnet 14 is made of the elastic member mixed with the powered magnetic material, a rubber material can be employed for the elastic member. In such case, the resultant multi-pole magnet 14 will be a rubber magnet. For the powdered magnetic material, ferrite may be employed.

Where the multi-pole magnet 14 is made of a plastics material mixed with the powdered magnetic material, the resultant multi-pole magnet 14 is a magnet molded by mixing in a plastics material with the powdered magnetic material such as, for example, a powder of rare earth magnets or a powder of ferrite magnet. The plastics magnet exhibits a high precision as molded and can easily molded to any desired complicated shape such as a thin-walled product.

Where the multi-pole magnet 14 is in the form of the sintered magnet, a magnetic powder obtained by pulverizing a raw material alloy is press-molded by the use of a press with particles thereof oriented in a predetermined direction in a magnetic field, followed by magnetization after it has been sintered. The sintered magnet is advantageous in that it can provide a high magnetic force. For the powdered magnetic material, a ferrite magnet or a rare earth magnet of a neodymium system or a samarium system may be employed. The sintered magnet providing the multi-pole magnet 14 may not be always of a kind in which only the powdered magnetic material is sintered, but may be of a kind in which a mixture of the powdered magnetic material with any other material is sintered.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in the foregoing description, the various embodiments of the present invention including the various variations thereof have been described as applied to the wheel support bearing assembly of the third or first generation, the present invention can be equally applied to the wheel support bearing assembly of a second generation, or of a fourth generation in which the constant speed universal joint is integrated.

Accordingly, such changes and modifications are, unless they depart from the scope of the present invention as delivered from the claims annexed hereto, to be construed as included therein.

What is claimed is:

1. A wheel support bearing assembly comprising:

an outer member;

an inner member positioned inside the outer member to define an annular space therebetween;

at least one row of rolling element accommodated within the annular space and operatively interposed between the inner and outer members;

a sealing device for sealing an open end of the annular space;

a protective cover of a generally L-shaped section having an upright wall and a generally cylindrical wall both defined therein; and an annular multi-pole magnet having a plurality of different magnetic poles alternating in a direction circumferentially thereof and fitted to the radial wall of the first sealing plate, said multi-pole magnet being secured to an inner face of the upright wall of the protective cover;

wherein said sealing device comprises first and second annular sealing plates fitted to different members out of the inner and outer members, each of the first and second sealing plate including a generally cylindrical wall and a radial wall assembled together to represent a generally L-shaped section, the first and second sealing plates being positioned within the annular space in face-to-face relation with each other, the first sealing plate being fitted to a rotating member out of the inner and outer members with the radial wall of the first sealing plate positioned on one side adjacent an exterior of the bearing assembly; and the second sealing plate including a side sealing lip, slidingly engaged with the radial wall of the first sealing plate and opposedly extending radial sealing lips slidingly engaged with the cylindrical wall of the first sealing plate, the cylindrical wall of the second sealing plate being positioned adjacent a slight distance from a free edge of the radial wall of the first sealing plate with a slight radial gap defined therebetween;

wherein the protective cover is positioned so as to confront the upright wall of the first sealing plate and said cylindrical wall of the protective cover is mounted on one of the first and second members that serves as a rotating member; and wherein the cylindrical wall of the first sealing plate is mounted on the cylindrical wall of the protective cover.

* * * * *